US012752202B2

(12) United States Patent
Guinchard et al.

(10) Patent No.: US 12,752,202 B2
(45) Date of Patent: Oct. 6, 2026

(54) HANDHELD GAMING CONTROLLER AND THUMBSTICK ASSEMBLY

(71) Applicant: Embracer Freemode Inc., Livermore, CA (US)

(72) Inventors: Lee Guinchard, Livermore, CA (US); Jack Guinchard, Livermore, CA (US); Jared Chan, Hong Kong (CN)

(73) Assignee: Embracer Freemode Inc., Livermore, CA (US)

( * ) Notice: Subject to any disclaimer, the term of this patent is extended or adjusted under 35 U.S.C. 154(b) by 242 days.

(21) Appl. No.: 18/419,220

(22) Filed: Jan. 22, 2024

(65) Prior Publication Data

US 2024/0245998 A1 Jul. 25, 2024

Related U.S. Application Data

(60) Provisional application No. 63/516,437, filed on Jul. 28, 2023, provisional application No. 63/481,136, filed on Jan. 23, 2023.

(51) Int. Cl.

*A63F 13/95* (2014.01)
*A63F 13/24* (2014.01)
*A63F 13/92* (2014.01)

(52) U.S. Cl.

CPC .............. *A63F 13/92* (2014.09); *A63F 13/24* (2014.09)

(58) Field of Classification Search

CPC .......... A63F 13/24; A63F 13/82; A63F 13/98; A63F 13/92

See application file for complete search history.

(56) References Cited

U.S. PATENT DOCUMENTS 6,530,838 B2 * 3/2003 Ha .......................... A63F 13/24 345/169
6,671,170 B2 * 12/2003 Webb .................... G06F 1/1616 361/679.09

(Continued)

FOREIGN PATENT DOCUMENTS

KR 1020140025869 A 3/2014

OTHER PUBLICATIONS

Amazon Hawksbill Nintendo Switch Compatible Handheld Controller obtained at https://www.amazon.com/Hawksbill-Nintendo-Switch-Compatible-Handheld-Controller/dp/B09KT2TZK1/ref=sr_1_1?crid=2GLZU0UHW1NC&keywords=hawksbill+nintendo+switch&qid=1706304655&sprefix=hawksbill+nin%2Caps%2C122&sr=8-1; Jan. 26, 2024.

(Continued)

*Primary Examiner* — Chase E Leichliter
(74) *Attorney, Agent, or Firm* — Kolitch Romano Dascenzo Gates LLP

(57) ABSTRACT

A handheld videogame controller is configured to receive and securely hold a handheld videogame console (e.g., a Nintendo Switch console). The handheld videogame controller is configured to electronically connect directly to the videogame console (e.g., via a USB-C port of the console) to reduce latency and other connectivity issues. The handheld videogame controller includes a locking mechanism configured to securely hold the console within a docking bay of the controller, such that the console remains directly electronically connected to the controller during use. This facilitates a user moving the controller and the console as a single unit, without the console falling out of the controller unexpectedly. In some examples, the controller includes a thumbstick assembly including a thumbstick top removably coupled to a thumbstick base by a self-holding tapered connection (e.g., a Morse taper) to facilitate precise align- (Continued)

ment and transmission of torque from the thumbstick top to the thumbstick base.

18 Claims, 20 Drawing Sheets

(56) References Cited

U.S. PATENT DOCUMENTS

| | | | | |
|---|---|---|---|---|
| 6,795,304 | B1* | 9/2004 | Lam | G06F 1/1632 361/679.14 |
| D544,481 | S * | 6/2007 | Maddox | D14/401 |
| D548,235 | S * | 8/2007 | Krieger | D14/401 |
| 7,580,728 | B2* | 8/2009 | Vance | A63F 13/22 455/575.1 |
| 8,480,493 | B2* | 7/2013 | Liotta | A63F 13/92 463/37 |
| 8,939,838 | B2* | 1/2015 | Alten | A63F 13/24 463/36 |
| 8,944,912 | B2* | 2/2015 | Joynes | G06F 1/1632 463/36 |
| 9,261,909 | B2* | 2/2016 | Lam | G06F 1/1626 |
| 9,393,493 | B2* | 7/2016 | Danny | A63F 13/98 |
| 9,407,100 | B2* | 8/2016 | Joynes | A63F 13/92 |
| 9,753,493 | B2* | 9/2017 | Prejer | B60R 11/0252 |
| 10,258,876 | B2* | 4/2019 | Wells | A63F 13/22 |
| 10,328,350 | B2* | 6/2019 | Furuike | A63F 13/235 |
| 10,391,393 | B2* | 8/2019 | Townley | A63F 13/24 |
| 10,569,166 | B2* | 2/2020 | Grant | G06F 3/016 |
| 10,585,455 | B1* | 3/2020 | Barnes | G06F 1/1626 |
| 10,707,632 | B1* | 7/2020 | Yamamoto | H01R 33/7685 |
| 10,729,025 | B1* | 7/2020 | Hung | A63F 13/2145 |
| 11,027,191 | B2* | 6/2021 | Oh | A63F 13/98 |
| 11,325,027 | B1* | 5/2022 | Lu | A63F 13/98 |
| 11,583,762 | B2* | 2/2023 | Lu | A63F 13/24 |
| 11,839,810 | B2* | 12/2023 | Khaira | A63F 13/92 |
| 11,969,647 | B2* | 4/2024 | Lu | A63F 13/98 |
| 12,036,467 | B2* | 7/2024 | Kong | A63F 13/24 |
| 2001/0045938 | A1* | 11/2001 | Willner | A63F 13/24 348/E5.103 |
| 2005/0078086 | A1* | 4/2005 | Grams | A63F 13/24 345/158 |
| 2006/0252537 | A1* | 11/2006 | Wu | A63F 13/92 463/36 |
| 2006/0286943 | A1* | 12/2006 | Vance | A63F 13/98 455/90.1 |
| 2008/0146336 | A1* | 6/2008 | Feldman | A63F 13/24 463/37 |
| 2009/0291760 | A1* | 11/2009 | Hepburn | A63F 13/327 463/16 |
| 2010/0081505 | A1* | 4/2010 | Alten | G06F 1/1632 463/47 |
| 2012/0300376 | A1* | 11/2012 | Chang | A63F 13/92 361/679.01 |
| 2013/0058659 | A1* | 3/2013 | Umezu | A63F 13/235 398/128 |
| 2013/0154542 | A1* | 6/2013 | Joynes | A63F 13/92 320/101 |
| 2013/0157764 | A1* | 6/2013 | Joynes | A63F 13/23 463/37 |
| 2013/0159928 | A1* | 6/2013 | Joynes | A63F 13/2145 715/810 |
| 2014/0111912 | A1* | 4/2014 | Gobeil | G06F 1/1632 361/679.01 |
| 2014/0146193 | A1* | 5/2014 | Yang | H04N 23/661 348/211.4 |
| 2014/0256443 | A1* | 9/2014 | Joynes | A63F 13/26 463/37 |
| 2015/0018101 | A1* | 1/2015 | Schoenith | A63F 13/98 463/37 |
| 2015/0133221 | A1* | 5/2015 | Danny | A63F 13/92 345/184 |
| 2015/0273325 | A1* | 10/2015 | Falc | A63F 13/24 463/37 |
| 2016/0051902 | A1* | 2/2016 | Joynes | A63F 13/26 463/31 |
| 2016/0361634 | A1 | 12/2016 | Gassoway et al. | |
| 2017/0128830 | A1* | 5/2017 | Fujita | A63F 13/24 |
| 2017/0319953 | A1* | 11/2017 | Townley | A63F 13/98 |
| 2017/0326448 | A1* | 11/2017 | Townley | A63F 13/31 |
| 2018/0036635 | A1* | 2/2018 | Townley | A63F 13/92 |
| 2018/0133594 | A1* | 5/2018 | Guo | A63F 13/245 |
| 2018/0165227 | A1* | 6/2018 | Maldonado | A63F 13/26 |
| 2018/0369692 | A1* | 12/2018 | Winick | A63F 13/355 |
| 2021/0197082 | A1* | 7/2021 | Seibert | G06F 13/102 |
| 2021/0252386 | A1* | 8/2021 | VanWyk | A63F 13/214 |
| 2021/0283494 | A1* | 9/2021 | Lee | A63F 13/92 |
| 2021/0283515 | A1* | 9/2021 | Del Valle | H04M 1/04 |
| 2021/0299553 | A1* | 9/2021 | Lu | G06F 1/1632 |
| 2021/0344786 | A1* | 11/2021 | Takura | A63F 13/92 |
| 2021/0346796 | A1* | 11/2021 | Yildiz | A63F 13/77 |
| 2021/0370164 | A1* | 12/2021 | Lu | A63F 13/235 |
| 2022/0331688 | A1* | 10/2022 | Khaira | A63F 13/235 |
| 2023/0226455 | A1* | 7/2023 | Brand | A63F 13/24 463/47 |
| 2023/0256331 | A1* | 8/2023 | Lu | A63F 13/24 463/37 |
| 2023/0256350 | A1* | 8/2023 | Stark | A63F 13/24 463/46 |
| 2023/0285848 | A1* | 9/2023 | Lee | A63F 13/235 |
| 2024/0024764 | A1* | 1/2024 | Cheng | A63F 13/24 |
| 2024/0050845 | A1* | 2/2024 | Ma | A63F 13/24 |
| 2024/0245998 | A1* | 7/2024 | Guinchard | A63F 13/24 |
| 2024/0245999 | A1* | 7/2024 | Cheng | A63F 13/24 |
| 2024/0293734 | A1* | 9/2024 | Guerrero, Jr. | A63F 13/24 |
| 2025/0222364 | A1* | 7/2025 | Weston | F16M 13/02 |
| 2025/0262528 | A1* | 8/2025 | Biheller | A63F 13/24 |

OTHER PUBLICATIONS

Amazon EcRonadX Switch Controllers obtained at https://www.amazon.com/Controllers-Compatible-Controller-Replacement-Adjustable/dp/B0BC5SSKWZ/ref=sr_1_1_sspa?crid=JAVMR0C2ERS1&keywords=ecronadx+switch+controllers&qid=1706304876&sprefix=EcRonadX%2Caps%2C163&sr=8-1-spons&sp_csd=d2lkZ2V0TmFtZT1zcF9hdGY&psc=1; Jan. 26, 2024.

Amazon CXY CHYUHSIN Joy-Con Switch Controller for Nintendo Switch obtained at https://www.amazon.com/CXY-CHYUHSIN-Controller-Nintendo-Switch/dp/B0B29H5SXZ/ref=sr_1_1_sspa?crid=6NNRBW1A4ZHK&keywords=cxy%2Bchyuhsin%2Bswitch%2Bcontroller%2Bone%2Bpiece&qid=1706305231&sprefix=cxy%2Bchyuhsin%2Bswitch%2Bcontroller%2Bone%2Bpiece%2Caps%2C116&sr=8-1-spons&sp_csd=d2lkZ2V0TmFtZT1zcF9hdGY&th=1; Jan. 26, 2024.

Amazon Switch Controller for Switch/Switch OLED obtained at https://www.amazon.com/Controller-Nintendo-Ergonomic-Handheld-Vibration/dp/B09YM9XZ6Q/ref=sr_1_4?crid=3QTR211CWY63&keywords=hudobbye%2Bswitch%2Bcontroller&qid=1706306739&sprefix=hudobbye%2Bswitch%2Bcontroller%2Caps%2C124&sr=8-4; Jan. 26, 2024.

Amazon ECHZOVE Switch Controller Grip obtained at https://www.amazon.com/Controller-Ergonomic-Induction-Gyroscope-Vibration/dp/B08CDKDYXY/ref=sr_1_3?crid=3W1OL213EUYKV&keywords=echzove%2Bwireless%2Bcontroller%2Bfor%2Bnintendo%2Bswitch&qid=1706296549&sprefix=echzove%2Bwireless%2Bcontroler%2Bfor%2Bnintendo%2Bswitch%2Caps%2C119&sr=8-3&th=1; Jan. 26, 2024.

Backbone One—PlayStation Edition for iPhone—Lightning obtained at https://playbackbone.com/products/backbone-one-playstation/; Jan. 26, 2024.

* cited by examiner

HANDHELD GAMING CONTROLLER AND THUMBSTICK ASSEMBLY

CROSS-REFERENCES

The following applications and materials are incorporated herein, in their entireties, for all purposes: U.S. Provisional Patent Application Ser. No. 63/481,136, filed Jan. 23, 2023; U.S. Provisional Patent Application Ser. No. 63/516,437, filed Jul. 28, 2023.

FIELD

This disclosure relates to systems and methods for videogame controllers. More specifically, the disclosed embodiments relate to handheld videogame controllers.

INTRODUCTION

Standard controllers for videogame systems are often unergonomic and comprise low quality components that easily break or have other issues, such as joystick drift. Additionally, many standard controllers now connect to videogame consoles using Bluetooth or infrared, resulting in high latency and other connectivity issues. For these reasons and many other reasons, many standard videogame controllers provide a low quality gaming experience for users.

SUMMARY

The present disclosure provides systems, apparatuses, and methods relating to handheld videogame controllers and thumbstick assemblies.

In some examples, a handheld videogame controller comprises: a housing including a docking bay configured to selectively receive a handheld videogame console; a first electronic connector disposed in the docking bay and configured to mate with a second electronic connector of the console to electronically connect the controller to the handheld videogame console; and a locking mechanism including: at least one latch biased toward an inward position in which the at least one latch is configured to retain the console in the docking bay, such that the first electronic connector remains mated with the second electronic connector; and a release actuator configured to be actuated by a user to release the at least one latch from the handheld videogame console, such that the console is permitted to move with respect to the docking bay.

In some examples, a thumbstick assembly for a videogame controller comprises a thumbstick base including a tapered post; and a thumbstick top including a head and a shaft extending away from the head, wherein the thumbstick top includes a tapered bore formed in the shaft, and wherein the tapered bore and the tapered post have a matching taper; wherein the thumbstick top is configured to be selectively and repeatedly coupled to and removed from the thumbstick base by only a self-holding tapered connection between the tapered bore and the tapered post.

Features, functions, and advantages may be achieved independently in various embodiments of the present disclosure, or may be combined in yet other embodiments, further details of which can be seen with reference to the following description and drawings.

DETAILED DESCRIPTION

Figure 1:
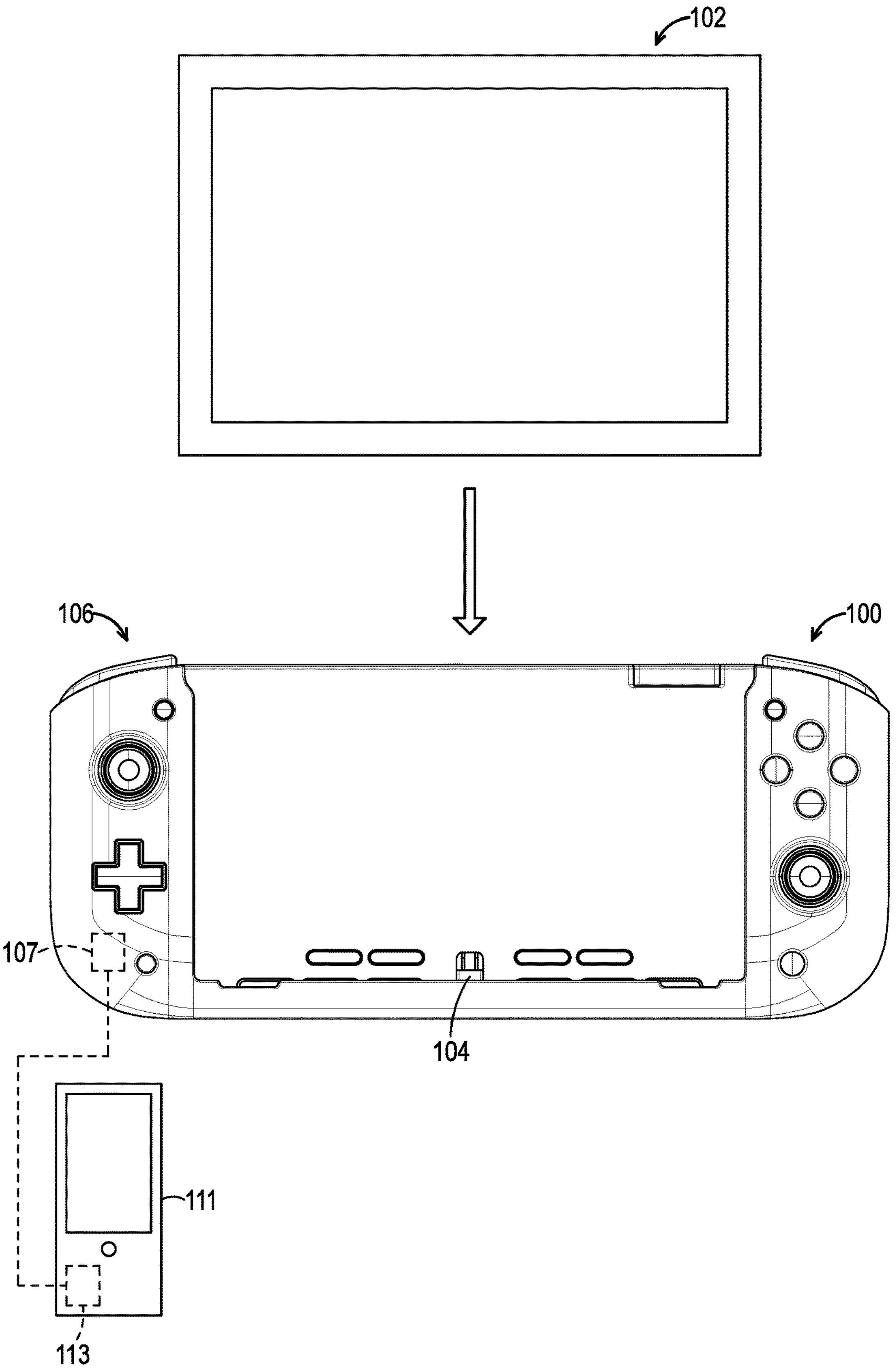
FIG. 1 is a schematic diagram depicting an illustrative handheld videogame controller and videogame console in accordance with aspects of the present disclosure.

Various aspects and examples of a direct connect handheld videogame controller and customizable thumbstick assemblies, as well as related methods, are described below and illustrated in the associated drawings. Unless otherwise specified, a handheld video game controller in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a handheld videogame controller (AKA handheld deck) in accordance with the present teachings is configured to receive and securely hold a handheld videogame console (e.g., a Nintendo Switch® console). The handheld videogame controller is configured to electronically connect directly to the videogame console (e.g., via a USB-C or other port of the console) to provide enhanced controller functionality. The handheld videogame controller includes one or more buttons, directional pads, triggers, thumbsticks, and/or the like, in communication with internal electronic components of the controller (e.g., a circuit board), such that actuation of the one or more buttons, directional pads, triggers, and/or thumbsticks causes electrical signals to be sent to the console via the direct connection between the controller and the console. In comparison to controllers that connect to the videogame console wirelessly, e.g., via Bluetooth® or infrared, handheld videogame controllers of the present teachings are configured to reduce latency and other connectivity issues by connecting directly to the console. Furthermore, handheld videogame controllers disclosed herein are configured to be securely coupled to the console to prevent detachment of the console from the controller during use. This facilitates a user moving the controller and the console as a single unit, without the console being dislodged and/or falling out of the controller unexpectedly.

Handheld videogame controllers of the present disclosure include a housing configured to enclose and protect the internal electronic components of the controller, such as one or more circuit boards. In some examples, the controller includes a front housing and a rear housing configured to enclose the electronic components of the controller. The one or more buttons, directional pads, triggers, thumbsticks, and/or the like may extend through the housing of the controller and connect to the internal electronic components of the controller. The one or more buttons, directional pads, triggers, thumbsticks, and/or the like may be disposed at any suitable positions on the controller. The housing of the controller has an ergonomic shape that is configured to be comfortable to hold.

The controller is configured to securely receive the videogame console, such that the controller automatically directly connects to the videogame console when receiving the console, via a mutual USB-C connection and/or by any other suitable electronic connector or mechanism. In some examples, the controller may be configured to plug into or otherwise mate with a USB-C receptacle of the console as the console is slid into a docking bay of the controller. When assembled, the one or more circuit boards of the controller are in electronic communication with the USB-C connector, such that electrical signals generated by actuation of one of the one or more buttons, directional pads, triggers, and/or thumbsticks of the controller are transmitted to the console via the USB-C connection. By directly connecting to the console, the handheld controller is configured to reduce latency and prevent other connectivity issues.

The handheld videogame controller includes a console receptacle area (AKA a docking bay) configured to receive and securely hold the videogame console. The console receptacle area may include any suitable structure(s) configured to selectively receive the videogame console. In some examples, the console receptacle area includes a U-shaped channel or trough having left, right, and bottom channels configured to receive and securely hold the console. In such examples, the console is received by the controller by sliding the console through the left and right channels to rest on a base of the bottom channel. In some examples, the console receptacle area comprises a rear wall configured to be disposed behind the videogame console when the console is received in the console receptacle area. The rear wall may form the rear wall of each of the left, right, and bottom channels of the receptacle area.

In some examples, the USB-C connector extends upward into the bottom channel of the console receptacle area, such that the USB-C connector is configured to be inserted into a USB-C port of the console. In such examples, the USB-C connector of the controller is configured to connect to a USB-C port disposed on a bottom side of the handheld console. The left, right, and bottom channels may be sized to accommodate the specific thickness of the handheld videogame console, such that the channels restrict the lateral movement of the videogame console in the receptacle area. In some examples, the console receptacle area is configured to accommodate one or more specific handheld videogame consoles (e.g., the Standard Nintendo Switch and OLED Nintendo Switch) having specific dimensions and one or more specific features. For example, the console receptacle area may have one or more vent openings formed in the rear wall that are configured to align with air vents of the console to dissipate heat generated by the console.

The console receptacle area includes a locking mechanism configured to secure the videogame console to the controller and prevent up and down motion of the console within the left, right, and bottom channels of the console receptacle area. The controller may include any suitable locking mechanism configured to temporarily secure the videogame console in place in the console receptacle area. In some examples, the locking mechanism is configured to permit the console to be received in the console receptacle area, such that the console is directly connected to the USB-C connector and the locking mechanism is configured to prevent the console from being disconnected from the USB-C connector or removed from the receptacle area during use. In some examples, the locking mechanism of the controller includes a user-actuatable release mechanism configured to be actuated by a user to disengage the locking mechanism from the console, such that the console is removable from the receptacle area. In some examples, the locking mechanism is configured to permit removal of the console from the receptacle area only in response to actuation of the release mechanism.

The controller may include customizable components configured to be customized according to the user's preferences. In some examples, the controller includes interchangeable thumbsticks, buttons, triggers, and/or directional pads of different sizes or heights, such that the controller is easily modified according to the user's preferences. In some examples, the controller includes customizable buttons disposed on a back side of the controller and a user of the controller may determine what each customizable button is configured to control in the videogame played on the console. For example, the controller may include two pairs of customizable buttons disposed on a rear side of the controller. In some examples, the controller includes one or more thumbsticks having hall sensors configured to reduce stick drift.

In some examples, the handheld videogame controllers include one or more novel thumbstick assemblies configured to provide an improved gaming experience for the user. These thumbstick assemblies may include a thumbstick base and a thumbstick top, where the thumbstick top is removably coupled to the thumbstick base by a self-holding tapered connection (e.g., having a Morse taper). For example, a tapered female member (e.g., a tapered bore) formed in a stem of the thumbstick top may mate with a tapered male member (e.g., tapered shaft or post) of the thumbstick base that has a matching taper to the tapered female member. In some examples, the tapered female member and tapered male member each have a standard Morse taper angle (e.g., approximately 1.49 degrees). The self-holding tapered connection between the thumbstick base and the thumbstick top facilitates precise alignment of the thumbstick top relative to the thumbstick base (e.g., centering the thumbstick top on the thumbstick base) and transmission of torque from the thumbstick top to the thumbstick base.

The tapered post and the tapered bore may have any suitable standard Morse taper angle. For example, both the tapered post and the tapered bore may have a taper angle between 1.4-1.45 degrees, between 1.45-1.5 degrees, or any suitable angle between 1.4 and 1.5 degrees including 1.4 and 1.5 degrees. As a specific example, the tapered bore and the tapered post may each have a taper angle of approximately 1.49 degrees. This results in approximately 1 mm change in diameter for every 19.22 mm length of the tapered bore or tapered post.

In some examples, the thumbstick base is configured to be disposed at least partially within a housing of the user input device (e.g., videogame controller). In some examples, the thumbstick base is mounted on a thumbstick module of the user input device. The thumbstick module may comprise any suitable electronic component of the user input device that is configured to transmit control signals based on movement of the thumbstick assembly. For example, the thumbstick module may include a movable post and one or more sensors (e.g., potentiometers) configured to detect movement of the movable post. The thumbstick base may be coupled to the movable post and is configured to transmit forces applied to the thumbstick top by a user to the movable post of the thumbstick module.

In some examples, the thumbstick top comprises a resilient and/or elastic material configured to facilitate removal and installation of the thumbstick top on the thumbstick base. In other words, the thumbstick top may comprise a material that is configured to partially deform when acted on by an external force, e.g., a user pulling the thumbstick top upward away from the thumbstick base, a user twisting the thumbstick top on the thumbstick base, and/or a user pushing the thumbstick top downward onto the thumbstick base. In some examples, the thumbstick top is configured to deform only when acted on by forces greater than standard forces applied to the thumbstick top while playing videogames. However, the thumbstick top may be configured to partially deform under forces applied by a user, without requiring the use of a tool. In some examples, the force applied by the user (e.g., twisting and pulling the thumbstick top upward) causes a partial deformation of the inner surface of the tapered bore contacting the outer surface of the tapered post. This may reduce the frictional force between the tapered bore and the tapered post to facilitate removal of the thumbstick top from the thumbstick base.

The thumbstick assemblies of the present teachings are configured to be utilized with any suitable user input device, such as the handheld videogame controllers disclosed herein. Although thumbsticks are discussed and illustrated in the context of video game controllers, thumbstick assemblies of the present disclosure may be utilized in any suitable application, such as with racing controllers, specialty controllers, keyboard thumbsticks, mouse thumbsticks, music/rhythm gaming controllers, VR or AR controllers, arcade-style gaming controllers, shooting game controllers, flight game controllers, and/or any other suitable controllers or user input devices where joysticks are a suitable solution. Thumbstick assemblies of the present disclosure may also be utilized in any suitable technology field, including: aviation (e.g., aircraft control devices), marine technology (e.g., submersible controls), robotics (e.g., bomb disposal robots, surgical robots, etc.), industrial machinery, wheelchairs, drones, cameras, medical devices (e.g., ultrasound machines), computer input devices, space exploration (e.g., spacecraft), agricultural equipment, heavy machinery (e.g., cranes, forklifts, excavators, etc.), surveillance systems, assistive technology for Computers, toys (e.g., remote control cars, planes, etc.), and/or the like.

In some examples, the handheld videogame controller of the present teachings includes any suitable component configured to store and transmit data (e.g., a unique identifier of the controller) wirelessly to a personal electronic device of a user, such that the user is able to verify the authenticity of the controller using the personal electronic device. For example, the controller may include an NFC tag configured to transmit a signal containing predetermined information including a unique identifier of the controller (e.g., a digital signature). In such examples, the personal electronic device of the user may include an NFC receiver configured to receive the signal. In some examples, the personal device of the user includes one or more software applications configured to determine the authenticity of the controller based on the unique identifier transmitted by the NFC tag of the controller to the NFC receiver of the personal device. In some examples, the one or more software applications on the user's personal device are configured to determine one or more of a batch number of the controller, a rarity rank of the controller, and/or any other suitable information about the controller.

Examples, Components, and Alternatives

The following sections describe selected aspects of illustrative handheld videogame controllers and thumbstick assemblies as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Handheld Videogame Controller

As shown in FIGS. 1-15, this section describes an illustrative handheld videogame controller 100. Handheld controller 100 is an example of handheld videogame controllers described in the overview section, above.

Figure 2:
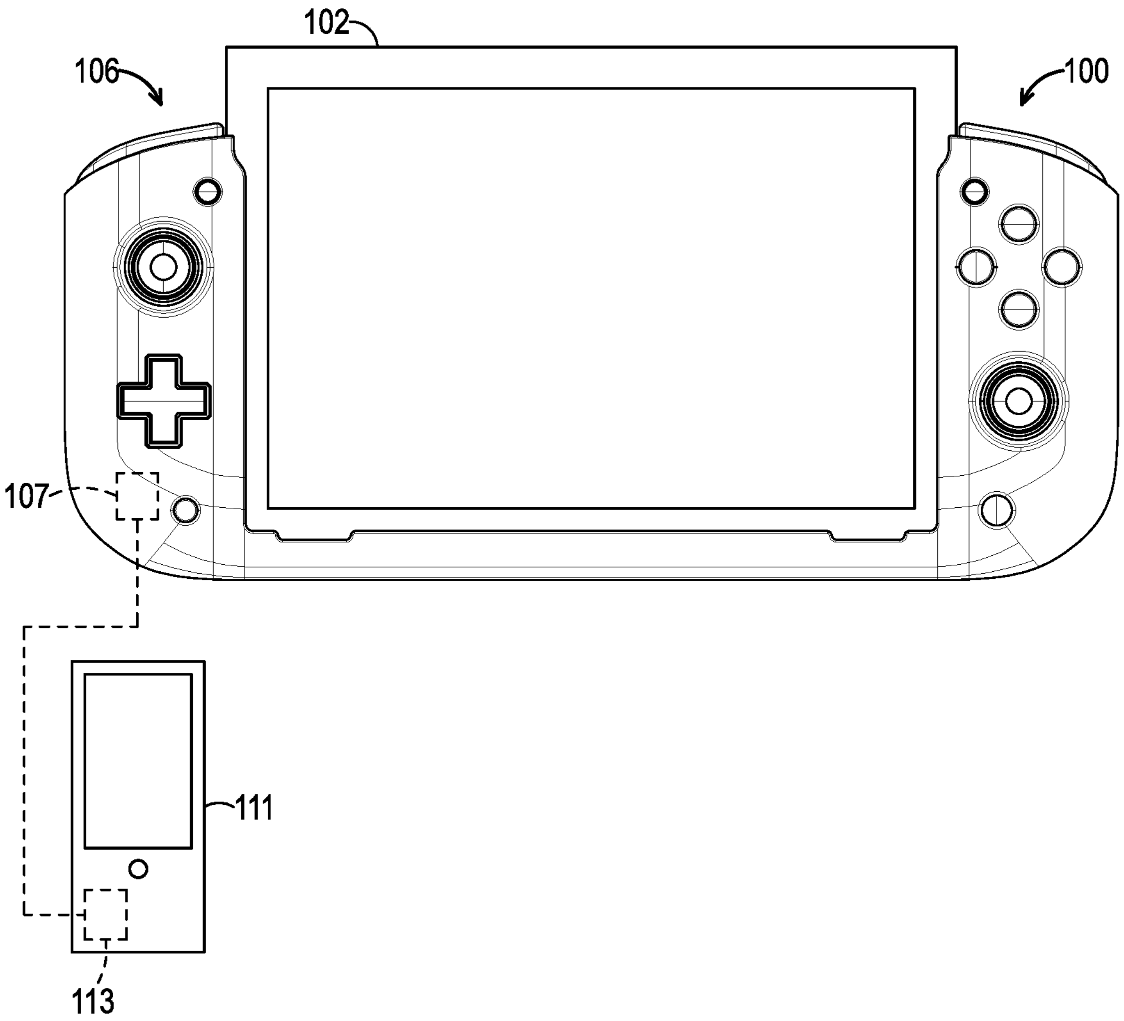
FIG. 2 is a schematic diagram depicting the videogame console inserted into and connected to the handheld videogame controller of FIG. 1.

As shown in FIGS. 1 and 2, handheld controller (AKA handheld deck) 100 is configured to receive and securely hold a handheld videogame console 102 (e.g., Standard Nintendo Switch®, OLED Nintendo Switch®, etc.). Handheld controller 100 is configured to directly connect to console 102 via an electronic connector 104 (e.g., a USB-C connector) and/or any other suitable mechanism. Handheld controller 100 is configured to receive and securely hold console 102 in a console receptacle area 106 (AKA a docking bay) of the controller. Console receptacle area 106 may comprise any suitable structure(s) configured to receive and securely hold console 102. In some examples, console receptacle area 106 of controller 100 is sized and shaped to accommodate a videogame console 102 having specific dimensions and features, e.g., a Standard Nintendo Switch®.

As shown in FIGS. 1 and 2, handheld videogame controller 100 may include an NFC tag 107 and/or any other suitable component configured to store and transmit data wirelessly to a personal electronic device (AKA smartphone) 111 of a user, such that the user is able to verify the authenticity of controller 100 using personal electronic device 111. For example, NFC tag 107 may be configured to transmit a signal containing predetermined information including a unique identifier of controller 100 (e.g., a digital signature) to personal electronic device 111. In such examples, personal electronic device 111 may include an NFC receiver 113 configured to receive the signal. In some examples, personal device 111 includes one or more software applications configured to determine the authenticity of controller 100 based on the unique identifier transmitted by NFC tag 107 to NFC receiver 113. In some examples, the one or more software applications on personal device 111 are configured to determine one or more of a batch number of the controller, a rarity rank of the controller, and/or any other suitable information about the controller. In this manner, NFC tag 107 is configured to facilitate the authentication of the handheld videogame controller 100 by a user. NFC tag 107 may be disposed at any suitable internal position of controller 100.

Figure 3:
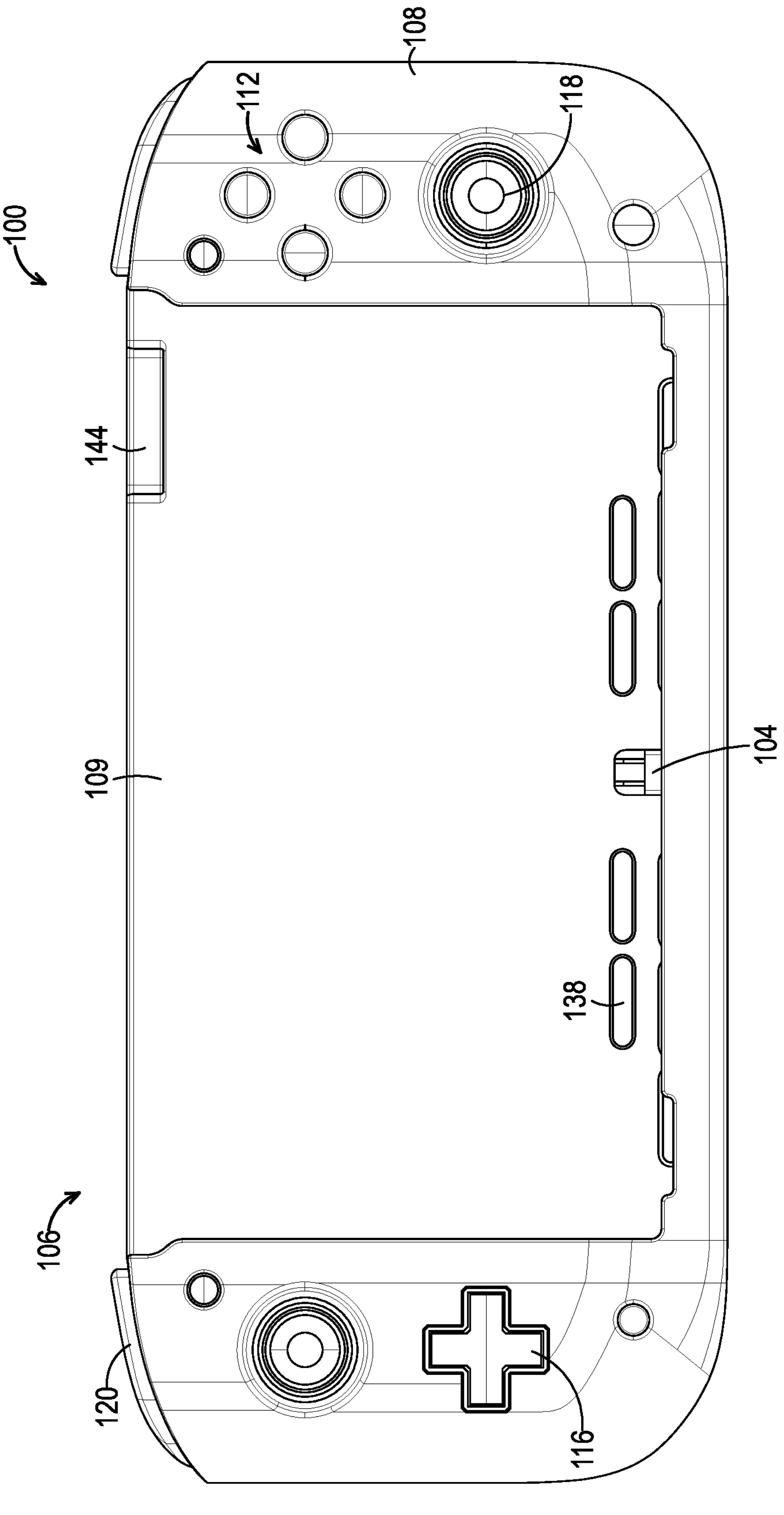
FIG. 3 is a front view of the videogame controller of FIGS. 1 and 2.
Figure 4:
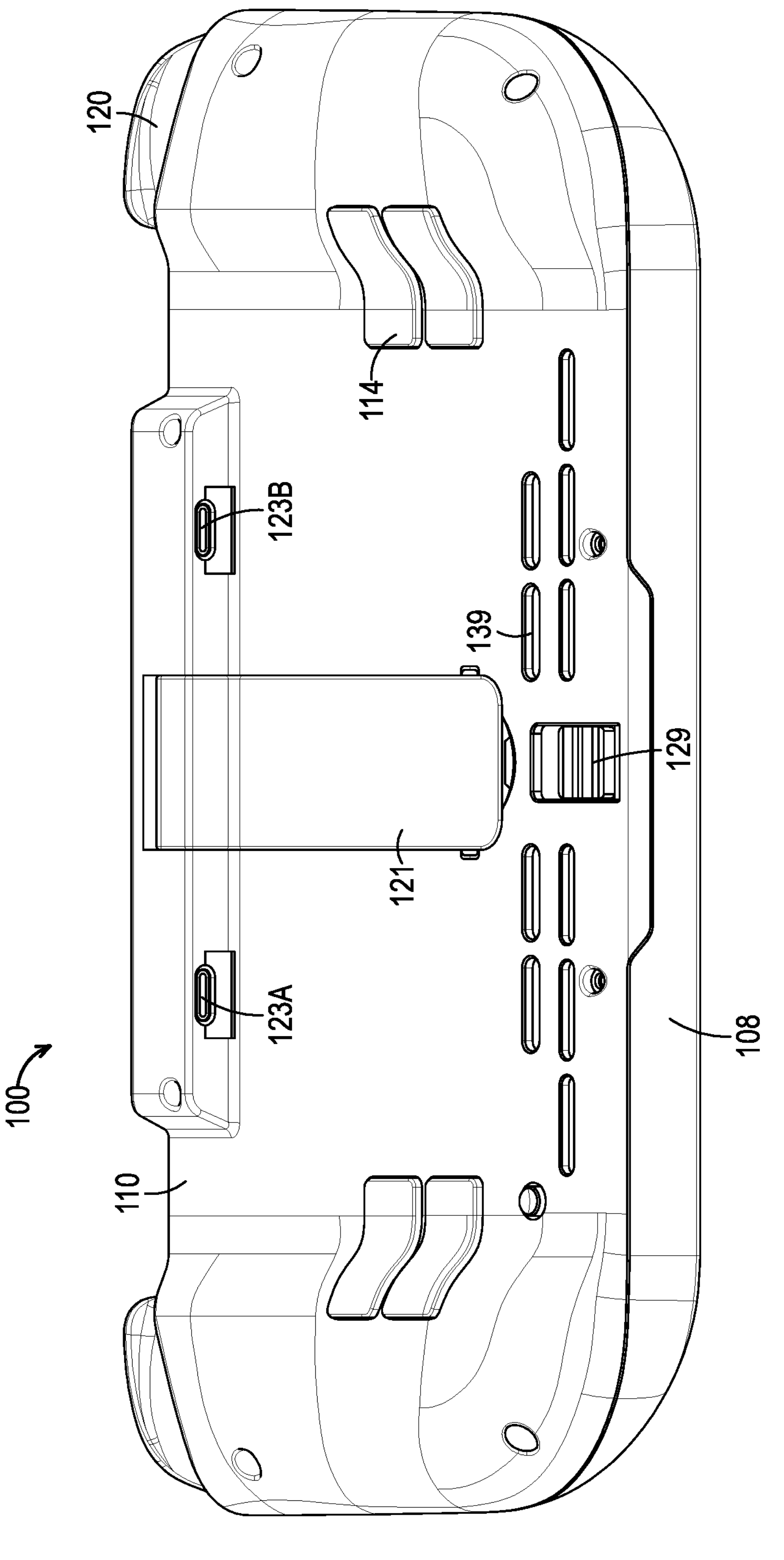
FIG. 4 is a rear perspective view of the videogame controller of FIGS. 1-3.
Figure 5:
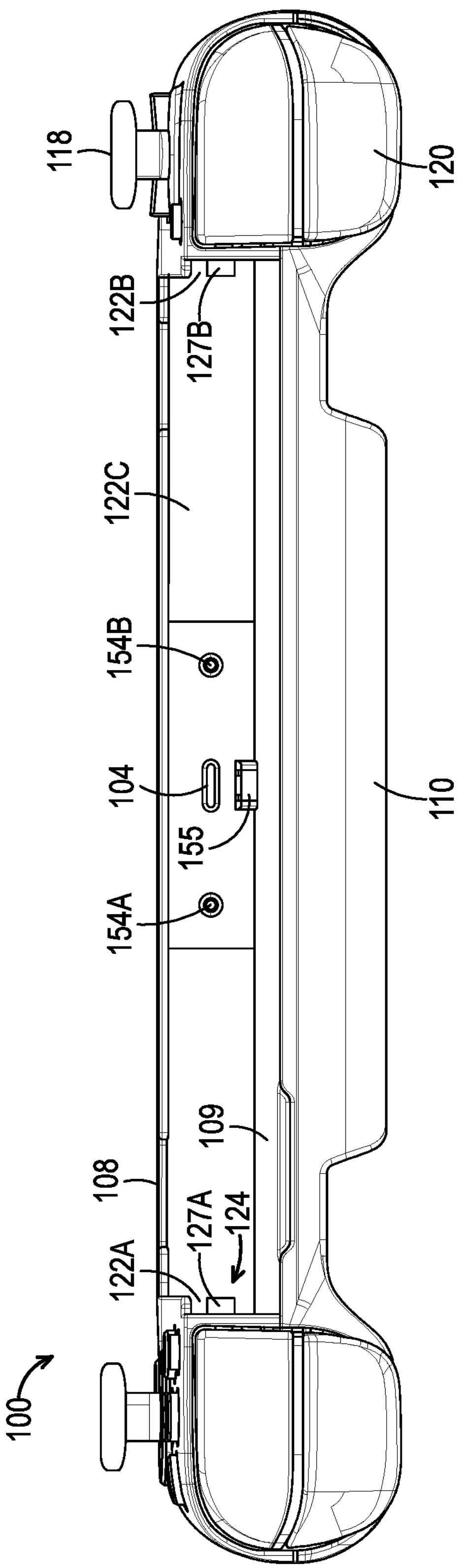
FIG. 5 is a top view of the videogame controller of FIGS. 1-4.

As shown in FIGS. 3-5, handheld controller 100 includes a front housing 108 and a rear housing 110. Together, front housing 108 and rear housing 110 are configured to enclose and protect internal electronic components of the controller. In some examples, the controller 100 includes an internal components mounting plate 109 configured to be operatively coupled to the internal components of the controller. Front housing 108 and rear housing 110 may be coupled to each other by any suitable mechanism (e.g., screws), such that the front and rear housing enclose the internal electronic components of the controller. Front housing 108 and rear housing 110 may have any suitable shape and size configured to be comfortable for a user to hold. Front housing 108 and rear housing 110 may comprise any suitable material (e.g., plastic) configured to be durable and to protect the internal electronic components of controller 100.

As shown in FIGS. 3-5, controller 100 includes one or more frontside buttons 112, backside buttons 114, directional pads 116, thumbsticks 118, triggers 120, and/or the like. Controller 100 is configured such that actuation of the one or more frontside buttons, backside buttons, directional pads, thumbsticks, and/or triggers causes electrical control signals to be sent from controller 100 to console 102 through the direct connection with console 102. Controller 100 may comprise any suitable buttons, directional pads, thumbsticks, triggers, and/or the like. In some examples, the frontside buttons, backside buttons, directional pads, thumbsticks, and/or triggers of the controller are removable and able to be replaced by buttons, directional pads, thumbsticks, and/or triggers of different sizes or shapes according to the user's preferences. In some examples, thumbsticks 118 are hall effect thumbsticks configured to reduce stick drift. In some examples, one or more of thumbsticks 118 comprise thumbstick assemblies 200, described further below. The frontside buttons, backside buttons, directional pads, thumbsticks, and triggers of controller 100 may be disposed at any suitable positions of the controller.

As shown in FIG. 4 depicting a rear side of controller 100, controller 100 includes a kickstand 121 pivotably coupled to rear housing 110 by a hinge and/or any other suitable mechanism. Kickstand 121 is configured to be rotated outward away from rear housing 110 and to support controller 100 in a generally upright position. As shown in FIG. 4, controller 100 includes one or more charging ports 123A and 123B disposed on a top portion of rear housing 110. Charging ports 123A and 123B may include any suitable charge receiver (e.g., USB-C ports) configured to receive a charge connector for charging a battery of controller 100 and/or console 102 itself. In some examples, controller 100 does not have a battery and receives charge from the direct connection with console 102 itself.

As shown in FIGS. 1-3 and 5, handheld controller 100 includes console receptacle area 106 (AKA a docking bay). Console receptacle area 106 is configured to receive and securely hold videogame console 102. In some examples, console receptacle area 106 is sized and shaped to accommodate a specific handheld videogame console 102, e.g., the Nintendo Switch, having specific dimensions and features. As shown in FIG. 5, in some examples console receptacle area 106 includes a right-side channel 122A disposed on a right side of the receptacle area and a left-side channel 122B disposed on a left side of the receptacle area. Console receptacle area 106 includes a bottom channel 122C extending horizontally between the bottom end of right-side channel 122A and the bottom end of left-side channel 122B. Right-side and left-side channels 122A, 122B each have an open upper end and a bottom end closed by bottom channel 122C.

Console receptacle area 106 is configured to receive console 102 by sliding the console through the open upper ends of right-side and left-side channels 122A-B until a bottom side of the console is disposed in bottom channel 122C. When console 102 is inserted in the channels of the console receptacle area, right-side channel 122A holds a right side of the console, left-side channel 122B holds a left side of the console, and bottom channel 122C holds a bottom side of the console. In some examples, right-side, left-side, and bottom channels 122A-C are each formed between front housing 108 and internal components mounting plate 109. The portions of channels 122A-C formed by front housing 108 may be configured to contact a front side of console 102 and the portions of the channels formed by internal components mounting plate 109 may be configured to contact a rear side of console 102. In some examples, right-side, left-side, and bottom channels 122A-C each have a width corresponding to the thickness of console 102, such that the channels are configured to securely hold the sides of the console and prevent lateral movement of the console in the receptacle area.

Explained in another way, right-side, left-side, and bottom channels 122A-C collectively form a U-shaped trough, slot, and/or channel configured to receive and hold console 102. The U-shaped trough is configured to securely hold and retain the left side, right side, and bottom side of the console 102. The U-shaped trough is configured to receive console 102, such that console 102 is automatically connected to the electronic connector 104 disposed in bottom channel 122C. For example, left-side and right-side channels 122A-B may be configured to guide the console into bottom channel 122C and bottom channel 122C may be configured to align the console with electronic connector 104 to facilitate the direct connection.

In some examples, console receptacle area 106 of controller 100 includes a locking mechanism 124 (AKA a latching mechanism or latch) configured to prevent console 102 from sliding out of console receptacle area 106, e.g., through the open upper ends of right-side and left-side channels 122A, 122B. Console receptacle area 106 may include any suitable locking mechanism 124 configured to allow console 102 to slide into console receptacle area 106 and configured to prevent console 102 from sliding out of the open upper ends of right-side and left-side channels 122A, 122B. As shown in FIGS. 5 and 11-15, locking mechanism 124 includes a first locking member 126A having a right-side latch portion 127A extending into right-side channel 122A and a second locking member 126B having a left-side latch portion 127B extending into left-side channel 122B. Right-side and left-side locking members 126A-B are configured to allow the console to slide into console receptacle area 106 of controller 100 and prevent console 102 from sliding out of console receptacle area 106. For example, latch portions 127A-B of locking members 126A-B may be configured to engage respective channels or grooves disposed on the sides of the console to secure the console in the channels of the receptacle area.

As shown in FIGS. 4 and 13-15, locking mechanism 124 further includes a user-actuatable release mechanism (AKA release actuator) 128 in the form of a wedge 129 configured to be actuated to disengage latch portions 127A-B of right-side and left-side locking members 126A-B from console 102, such that console 102 is able to be removed from console receptacle area 106. Locking mechanism 124 and release mechanism 128 of controller 100 are described in more detail, below.

Figure 6:
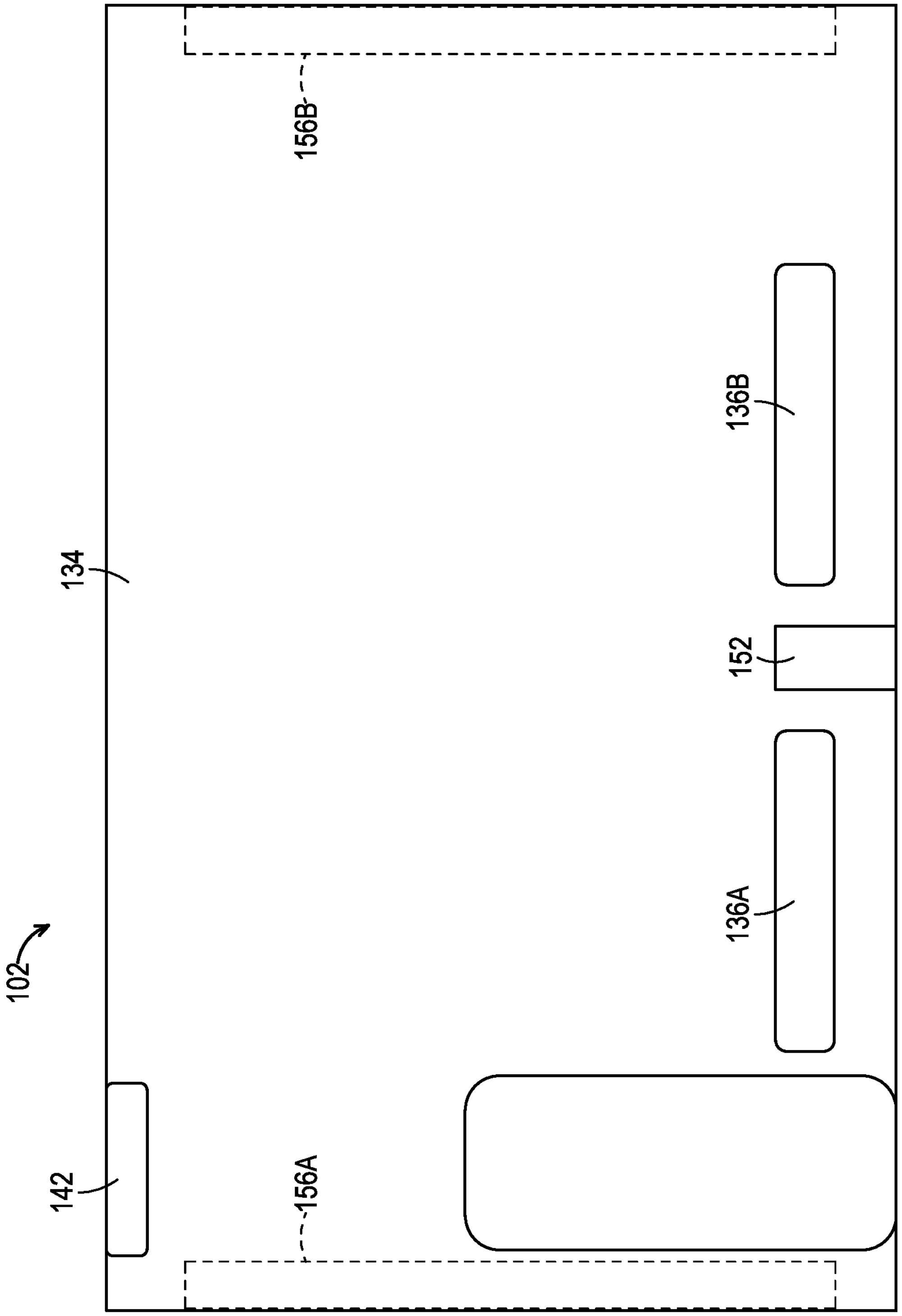
FIG. 6 is a rear view of the handheld videogame console of FIGS. 1 and 2.

In some examples, console receptacle area 106 includes specific features configured to accommodate one or more specific handheld videogame consoles (e.g., a Standard Nintendo Switch and an OLED Nintendo Switch). For example, console receptacle area 106 may be configured to accommodate handheld videogame console 102, depicted in FIGS. 6-9. As shown in FIG. 6 depicting a rear 134 of console 102, rear 134 of console 102 includes a first air vent 136A and a second air vent 136B. As shown in FIGS. 3-4, internal components mounting plate 109 and rear housing 110 of controller 100 each include a plurality of vent openings (138, 139) configured to align with first and second air vents 136A-B of console 102 when console is received in receptacle area 106. Vent openings 138 of internal components mounting plate 109 are coupled to vent openings of rear housing 110, such that air flowing out of console 102 through air vents 136A-B is allowed to flow out of controller 100 through vent openings (138, 139).

Figure 7:
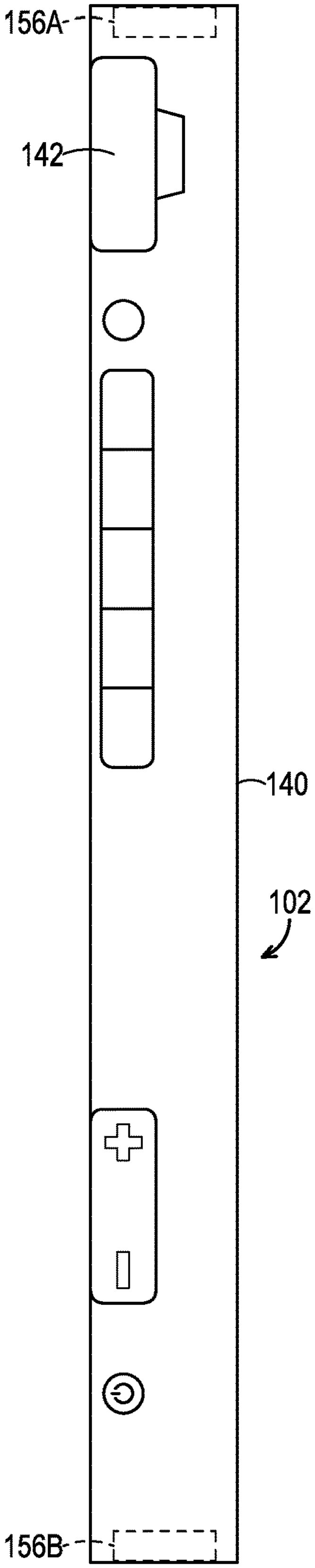
FIG. 7 is a top view of the handheld videogame console of FIGS. 1-2 and 6.

As shown in FIG. 7 depicting a top 140 of console 102, top 140 includes a videogame receiving area 142 configured to be opened to receive a videogame disk or chip. As shown in FIG. 3, console receptacle area 106 includes a recess 144 disposed in a surface of internal components mounting plate 109 of controller 100. When console 102 is inserted in console receptacle area 106 of controller 100, recess 144 is aligned with videogame receiving area 142 of console 102. Recess 144 is configured to provide a space for opening videogame receiving area 142 to insert a videogame disk or chip into console 102.

Figure 8:
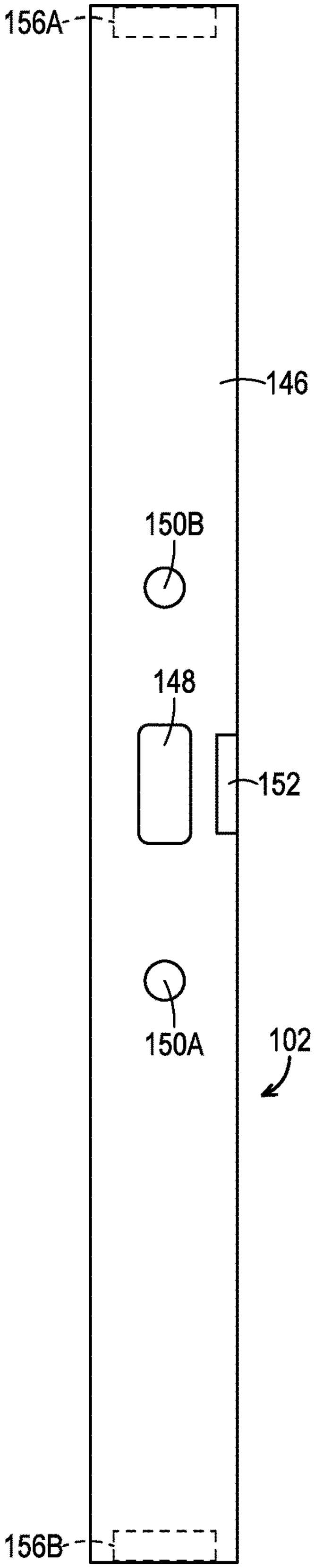
FIG. 8 is a bottom view of the handheld videogame console of FIGS. 1-2 and 6-7.

FIG. 8 depicts a bottom 146 of console 102. Bottom 146 of console 102 includes a USB-C port 148. As shown in FIG. 5, console receptacle area includes USB-C connector 104 extending upward into bottom channel 122C of console receptacle area 106. USB-C connector 104 is configured to connect to USB-C port 148 of console 102 to electronically connect the controller to the console. Bottom 146 of console 102 includes a pair of circular indentations 150A, 150B and a slot 152. To accommodate the circular indentations on the bottom of console 102, console receptacle area 106 includes a first boss 154A and a second boss 154B extending upward from a base of bottom channel 122C. First and second bosses 154A-B are configured to extend into circular indentations 150A-B, respectively. To accommodate slot 152 on the bottom of console 102, console receptacle area 106 includes a third boss 155 disposed in bottom channel 122C that is configured to extend into slot 152. First, second, and third bosses (154A-B, 155) are configured to facilitate correct alignment of the console within receptacle area 106 to ensure that the console is connected to the electronic connector.

Figure 9:
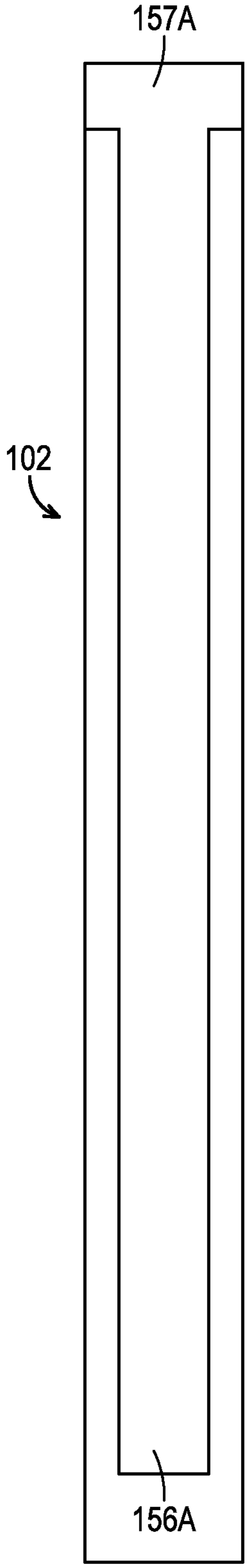
FIG. 9 is a side view of the handheld videogame console of FIGS. 1-2 and 6-8.

FIG. 9 depicts a right side 157A of console 102. Right side 157A is substantially identical to a left side 157B of console 102. Right side 157A includes a right-side groove, channel, and/or opening 156A. As shown in FIG. 9, right-side groove 156A is generally U-shaped having a closed lower end and an open upper end. Left side 157B of console 102 includes a left-side groove 156B that is identical to right-side groove 156A depicted in FIG. 9. In some examples, right-side latch portion 127A of locking mechanism 124 is configured to engage the closed lower end of right-side groove 156A and left-side latch portion 127B of locking mechanism 124 is configured to engage the closed lower end of left-side groove 156B to prevent console 102 sliding upward through the open upper ends of channels 122A, 122B of the console receptacle area. In some examples, handheld videogame console 102 includes other features not shown in FIGS. 6-9. Console receptacle area 106 of controller 100 may include any suitable features configured to accommodate the specific console.

Figure 10:
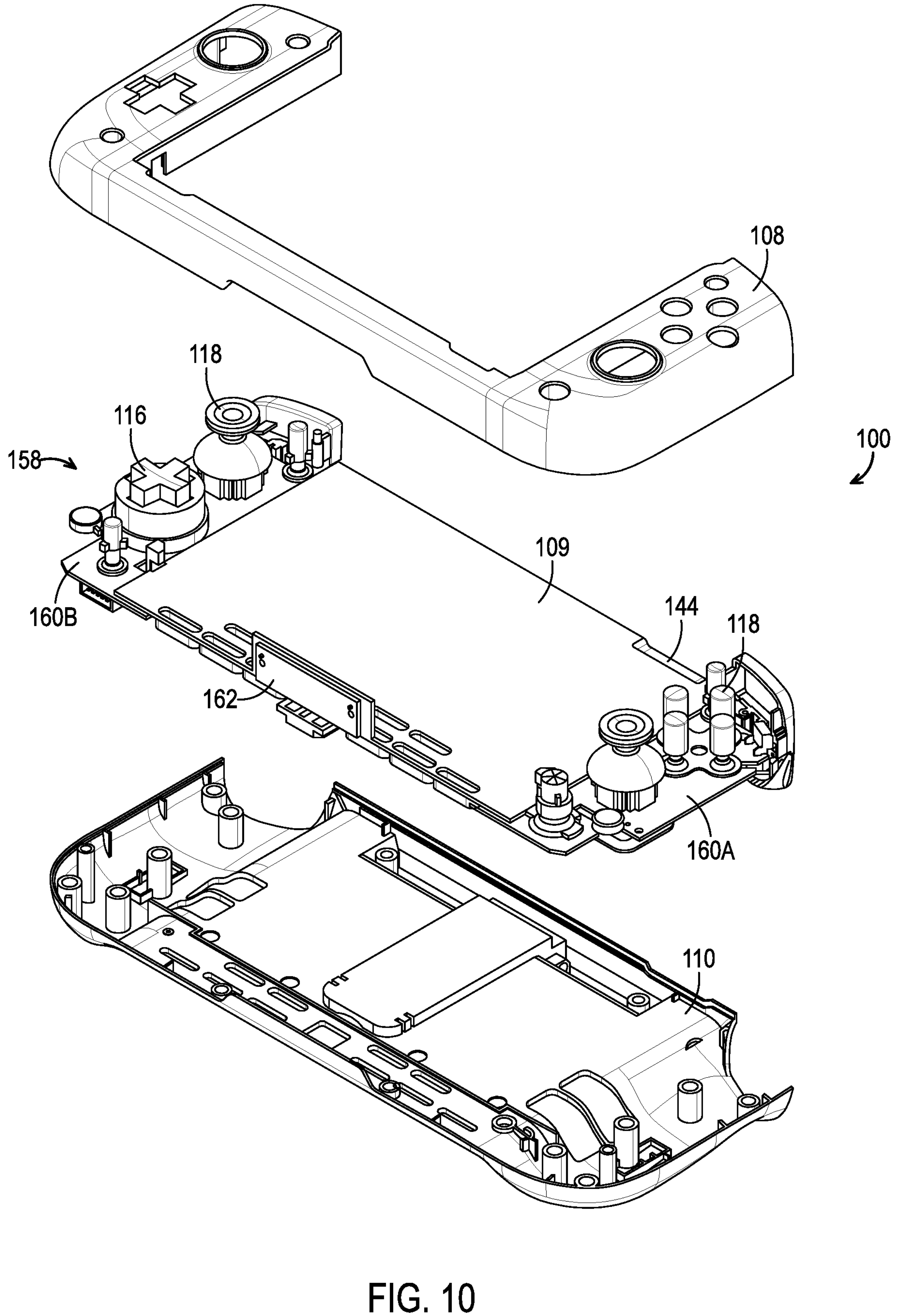
FIG. 10 is an exploded view of the handheld videogame controller of FIGS. 1-5.
Figure 11:
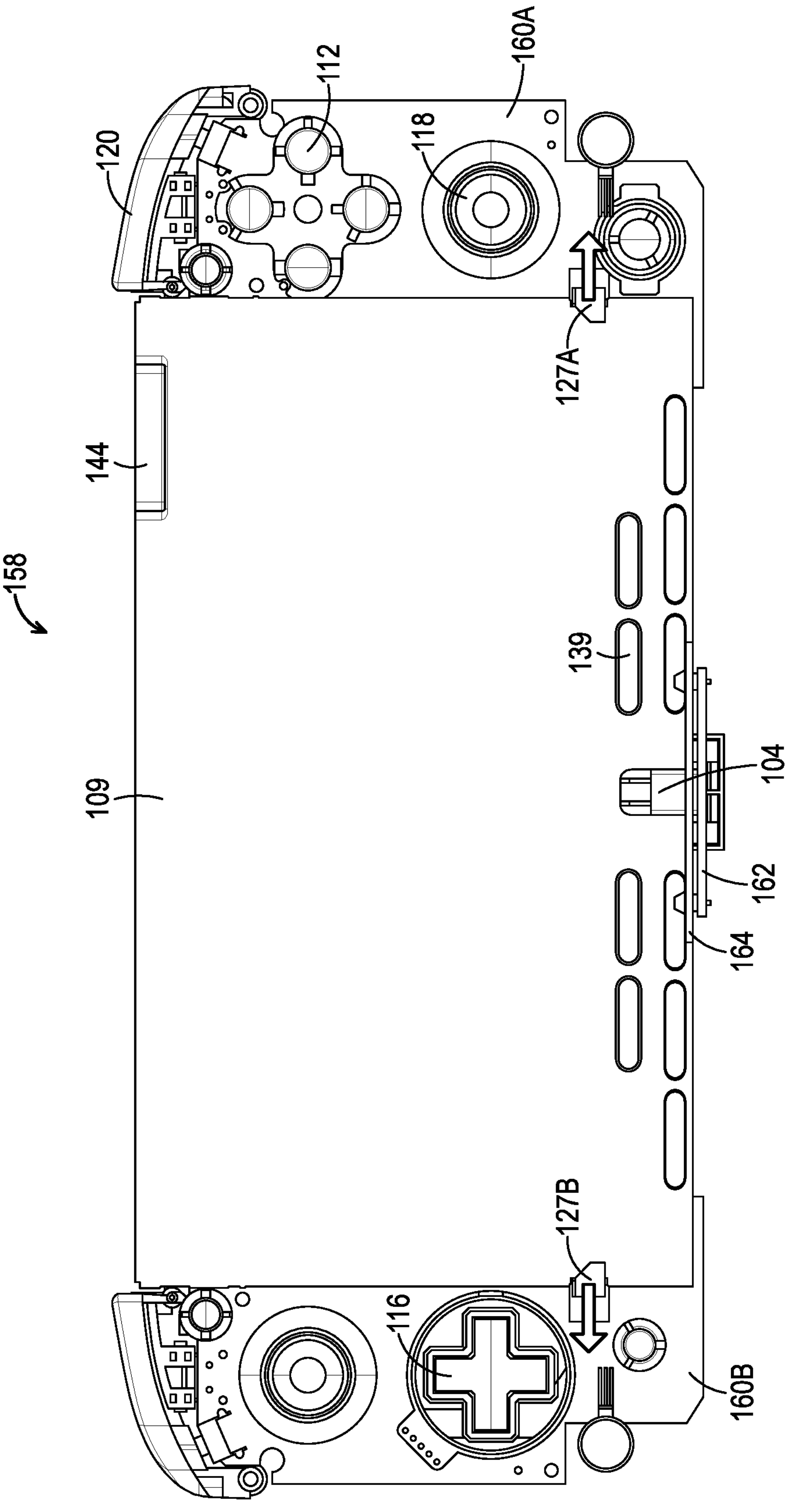
FIG. 11 is a front view of internal components of the handheld videogame controller of FIGS. 1-5 and 10.

FIG. 10 depicts an exploded view of controller 100. As shown in FIG. 10, controller 100 includes front housing 108, rear housing 110, and internal electronic components 158 coupled to internal components mounting plate 109. Internal electronic components 158 may comprise any suitable components configured to transmit electrical control signals to videogame console 102 through USB-C connector 104. For example, internal electronic components 158 may comprise one or more circuit boards 160A and 160B in electronic communication with USB-C connector 104. Front housing 108 and rear housing 110 are configured to enclose and protect circuit boards 160A-B. Front housing 108 may be coupled to rear housing 110 by any suitable fastener, e.g., one or more screws.

As shown in FIGS. 10-15, circuit boards 160A-B are each mounted on a respective side of mounting plate 109. One or more frontside buttons 112, backside buttons 114, directional pads 116, thumbsticks 118, and/or triggers 120 are configured as switches of circuit boards 160A-B, such that actuation of any one of the buttons, directional pads, thumbsticks, and/or triggers causes electrical signals to be sent through the circuit board to USB-C connector 104. USB-C connector 104 is configured to directly connect controller 100 to handheld videogame console 102 and transmit the electrical signals from circuit boards 160A-B to console 102.

Figure 12:
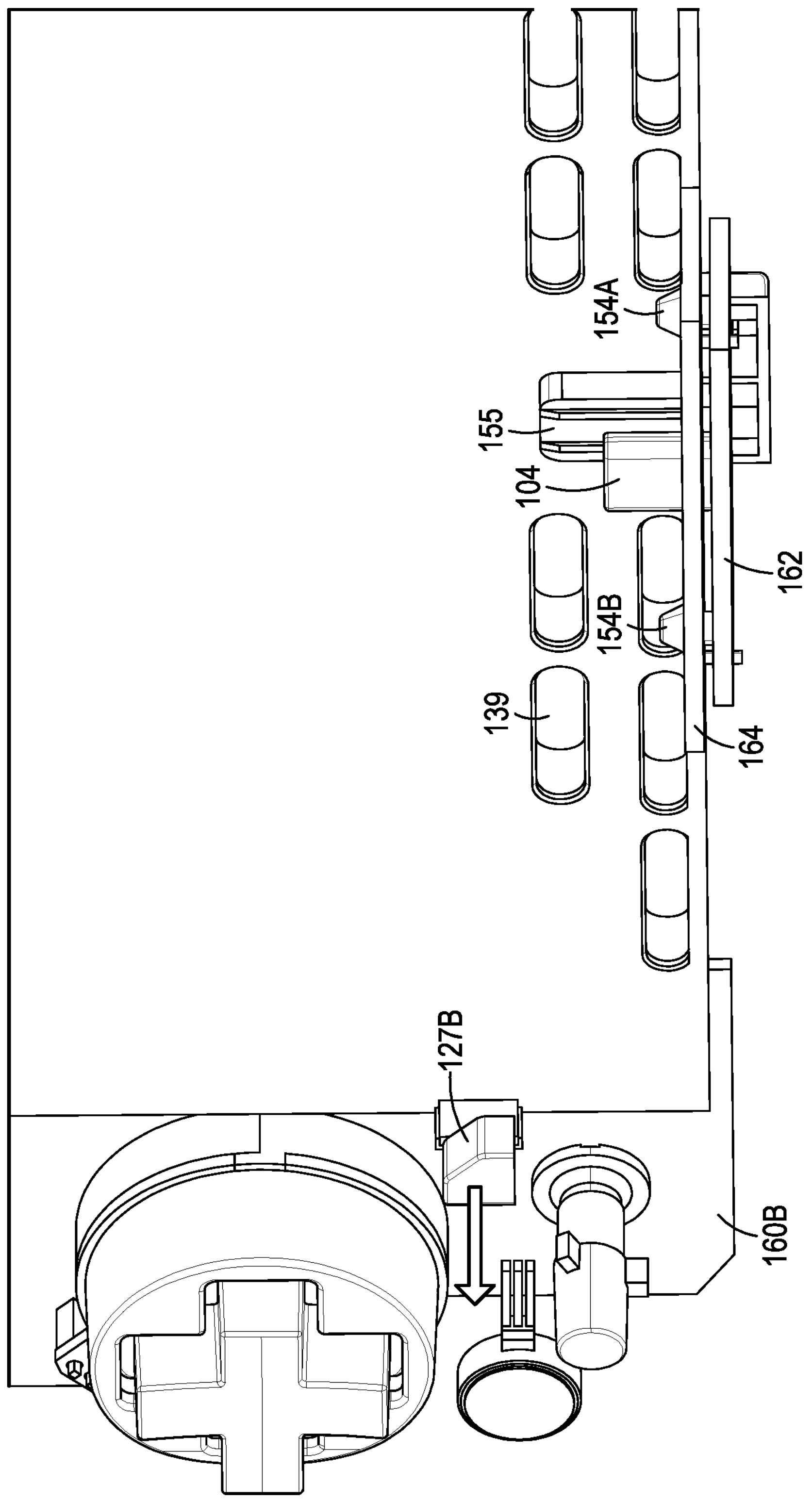
FIG. 12 is a magnified view of a USB-C connector and a locking mechanism of the handheld videogame controller of FIGS. 1-5 and 10-11.

USB-C connector 104 may be coupled to mounting plate in any suitable manner. As shown in FIG. 12, USB-C connector is coupled to a base plate 162 and base plate 162 is fastened to mounting plate 109. Base plate 162 is fastened to a bottom side of an extension 164 extending from a front side of internal components mounting plate 109. Extension 164 includes an opening and USB-C connector 104 extends vertically through the opening in extension 164. USB-C connector is in electronic communication with circuit boards 160A-B and configured to connect to USB-C port 148 on bottom 146 of console 102.

Controller 100 may comprise any suitable locking mechanism 124 configured to secure videogame console 102 to controller 100. In some examples, locking mechanism 124 is configured to secure console 102 in left-side, right-side, and bottom channels 122A-C of console receptacle area 106, such that console 102 is unable to slide out of receptacle area 106 through the open upper ends of the left-side and right-side channels. In some examples, locking mechanism 124 is configured to prevent a user from removing console 102 from console receptacle area 106. For example, locking mechanism 124 may prevent a user from sliding video game console 102 upward and out of right-side and left-side channels 122A-B. Locking mechanism 124 is configured to facilitate a user moving controller 100 and console 102 as a single unit, without console 102 falling out of controller 100 unexpectedly. Locking mechanism 124 facilitates maintaining the direct connection between USB-C connector 104 of controller 100 and USB-C port 148 of console 102 by preventing the movement of console 102 relative to controller 100. When the user wishes to remove console 102 from controller 100, the user must actuate release mechanism 128 to disengage locking mechanism 124, such that the console may be removed from the controller.

Figure 13:
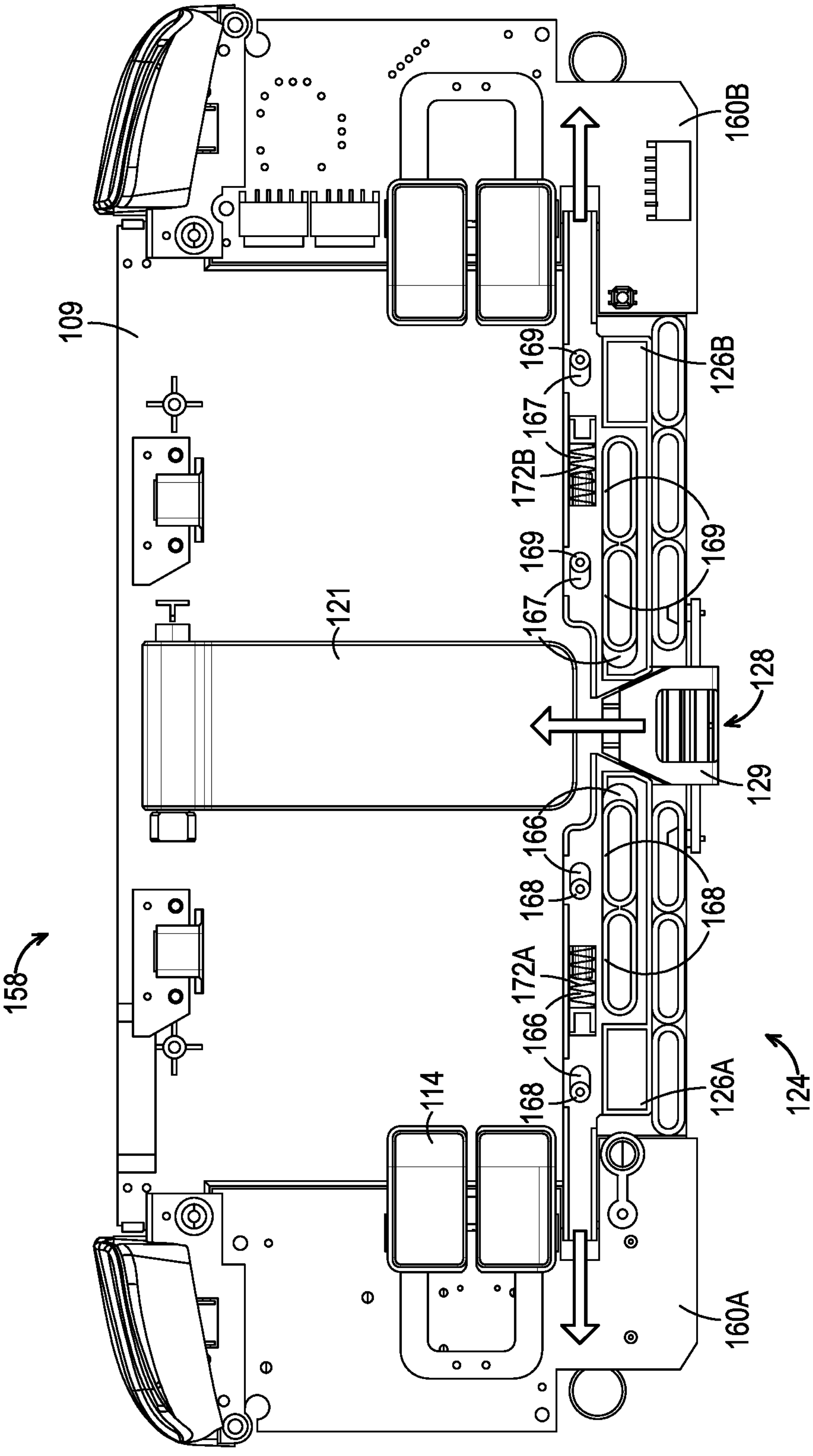
FIG. 13 is a rear view of internal components of the handheld videogame controller of FIGS. 1-5 and 10-12.
Figure 14:
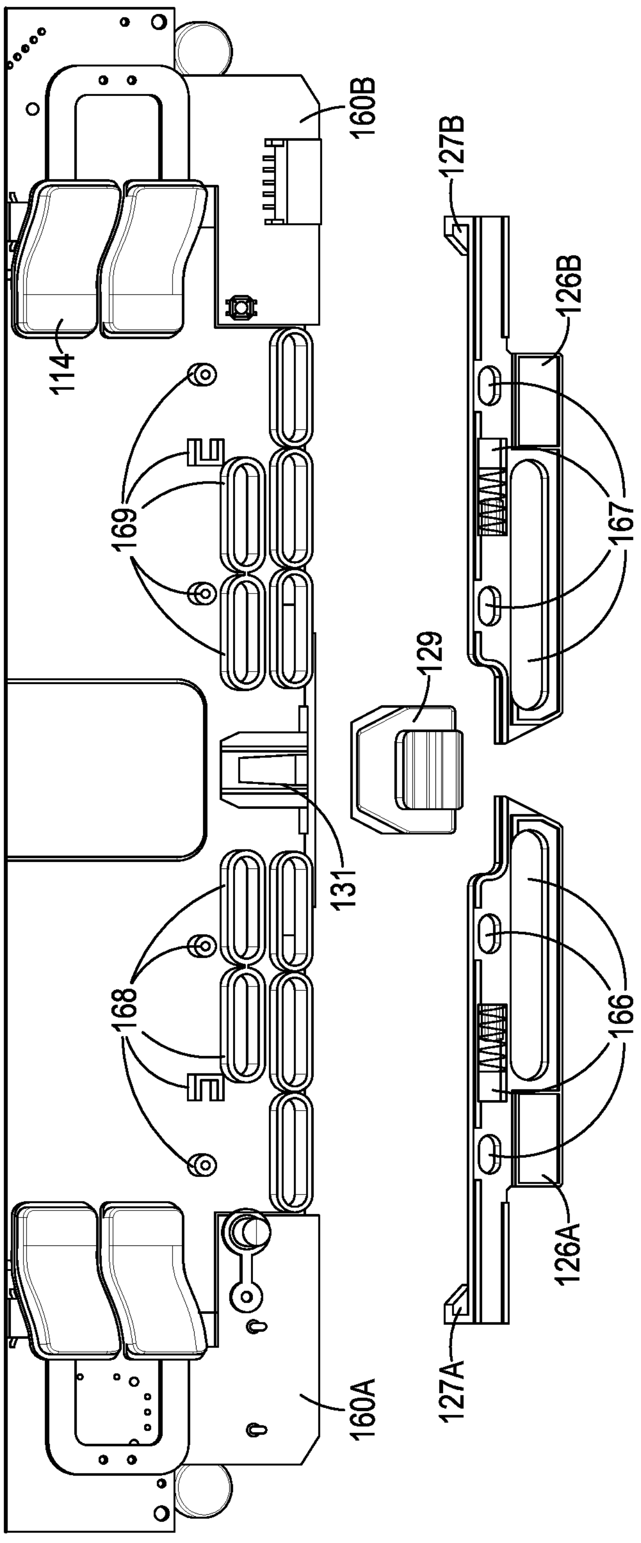
FIG. 14 is an exploded view depicting components of the locking mechanism of the handheld videogame controller of FIGS. 1-5 and 10-13.
Figure 15:
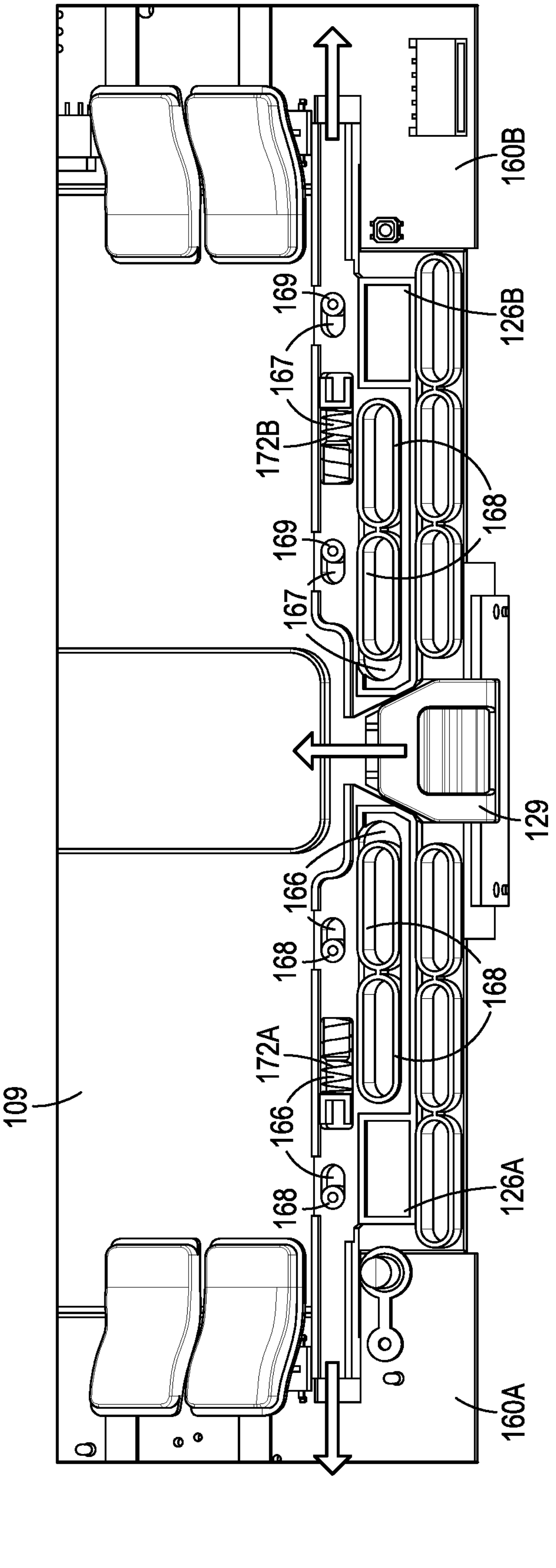
FIG. 15 is a close-up view of the locking mechanism and a release mechanism of the handheld videogame controller of FIGS. 1-6 and 11-15.

As shown in FIGS. 13-15, locking mechanism 124 includes first locking member 126A having slots 166 and second locking member 126B having slots 167. First and second locking members 126A-B are coupled to a rear side of mounting plate 109 by a plurality of first protrusions 168 extending into slots 166 of first locking member 126A and a plurality of second protrusions 169 extending into slots 167 of second locking member 126B. Each slot in the first and second locking members is sized larger than the one or more protrusions extending into the slot, such that locking members 126A-B are allowed to move a certain amount from side to side relative to mounting plate 109.

First locking member 126A includes a first elastic member 172A disposed in one of slots 166 and second locking member 126B includes a second elastic member 172B disposed in one of slots 167. Each elastic component 172A, 172B (e.g., a spring) is configured to bias the respective locking member 126A-B to an inward position. When locking members 126A-B are in the inward position, a respective latch 127A, 127B of each locking member is disposed in channels 122A-B. Elastic components 172A-B may comprise a spring (e.g., helical spring), elastomeric material, and/or any other suitable component configured to bias the locking members inward to an inward position and allow the locking members to be pushed outward to an outward position.

First locking member 126A includes right-side latch 127A configured to extend into right-side channel 122A of console receptacle area 106 and second locking member 126B includes left-side latch 127B configured to extend into left-side channel 122B of console receptacle area 106. Each latch 127A, 127B extends into the respective channel of console receptacle 106 when disposed in the inward position. Elastic components 172A-B are configured to permit each latch 127A, 127B to be transitioned to the outward position in which each latch is disposed outside of the respective channels of console receptacle area 106. When latches 127A, 127B are disposed in the outward position, console 102 is able to be moved up and down within the channels of console receptacle area 106.

When console 102 is inserted in right-side and left-side channels 122A-B of console receptacle area 106, console 102 contacts latches 127A-B of locking members 126A-B disposed in the right-side and left-side channels. As console 102 contacts latches 127A-B of locking members 126A-B and is moved downward through right-side and left-side channels 122A-B, latches 127A-B of locking members 126A-B are pushed outward and out of the right-side and left-side channels. When latches 127A-B of locking members 126A-B are pushed out of channels 122A-B, console 102 is allowed to slide down the right-side and left-side channels until a bottom of console 102 is disposed in bottom channel 122C and USB-C connector 104 is mated with USB-C port 148 of the console.

As shown in FIG. 9, the right and left sides of videogame console 102 each include a respective U-shaped groove 156A, 156B. Each U-shaped groove 156A, 156B has a closed bottom end. When latches 127A, 127B of locking members 126A, 126B are aligned with grooves 156A, 156B on the sides of the console, latches 127A-B move inwards and into grooves 156A, 156B due to the inward bias provided by elastic components 172A, 172B. Latches 127A-B are each disposed at a preselected height in channels 122A-B of receptacle area 106, such that latches 127A-B are configured to engage the closed bottom ends of grooves 156A, 156B on the sides of console 102. When latches 127A, 127B are engaged with grooves 156A, 156B on each side of the console, the console is prevented from sliding upward in the channels of the console receptacle area.

When latches 127A, 127B of locking mechanism 124 are engaged with console 102, console 102 is prevented from being removed from console receptacle area 106 inadvertently or by merely pulling or pushing the console relative to the controller. Instead, the console is securely retained until the user unlatches the locking mechanism. Controller 100 includes release mechanism 128 configured to release locking members 126A-B from engaging console 102, such that console 102 is able to be removed from controller 100. In some examples, the user is prevented from removing the console by the locking mechanism without using the release mechanism 128. In other words, the locking mechanism 124 may be configured to release the console 102 from the controller 100 only in response to a user actuating the release mechanism 128. This ensures that the console 102 is not inadvertently released from the controller 100 during use.

Controller 100 may comprise any suitable release mechanism 128 configured to push the inward biased locking members 126A-B outward, such that latches 127A-B are disengaged from features 156A-B disposed on the side of the console. As shown in FIGS. 14 and 15, release mechanism 128 includes a wedge 129 contacting locking members 126A-B and disposed between locking members 126A-B. Wedge 129 is configured to be pushed upward between locking members 126A-B, causing each locking member 126A-B to move outward and disengage the console. Mounting plate 109 includes a groove 131 and wedge 129 is configured to slide up and down on groove 131.

As shown in FIG. 4, wedge 129 of release mechanism 128 is exposed through rear housing 110, such that a user may access release mechanism 128, without requiring the user to remove rear housing 110. When in use, a user may slide wedge 129 upwards to release locking mechanism 124 from console 102, such that console 102 may be removed from controller 100.

B. Illustrative Thumbstick Assembly for Videogame Controller

As shown in FIGS. 16-20, this section describes an illustrative thumbstick assembly 200 for a videogame controller 202. Thumbstick assembly 200 is an example of thumbstick assemblies, described above in the Overview.

Figure 16:
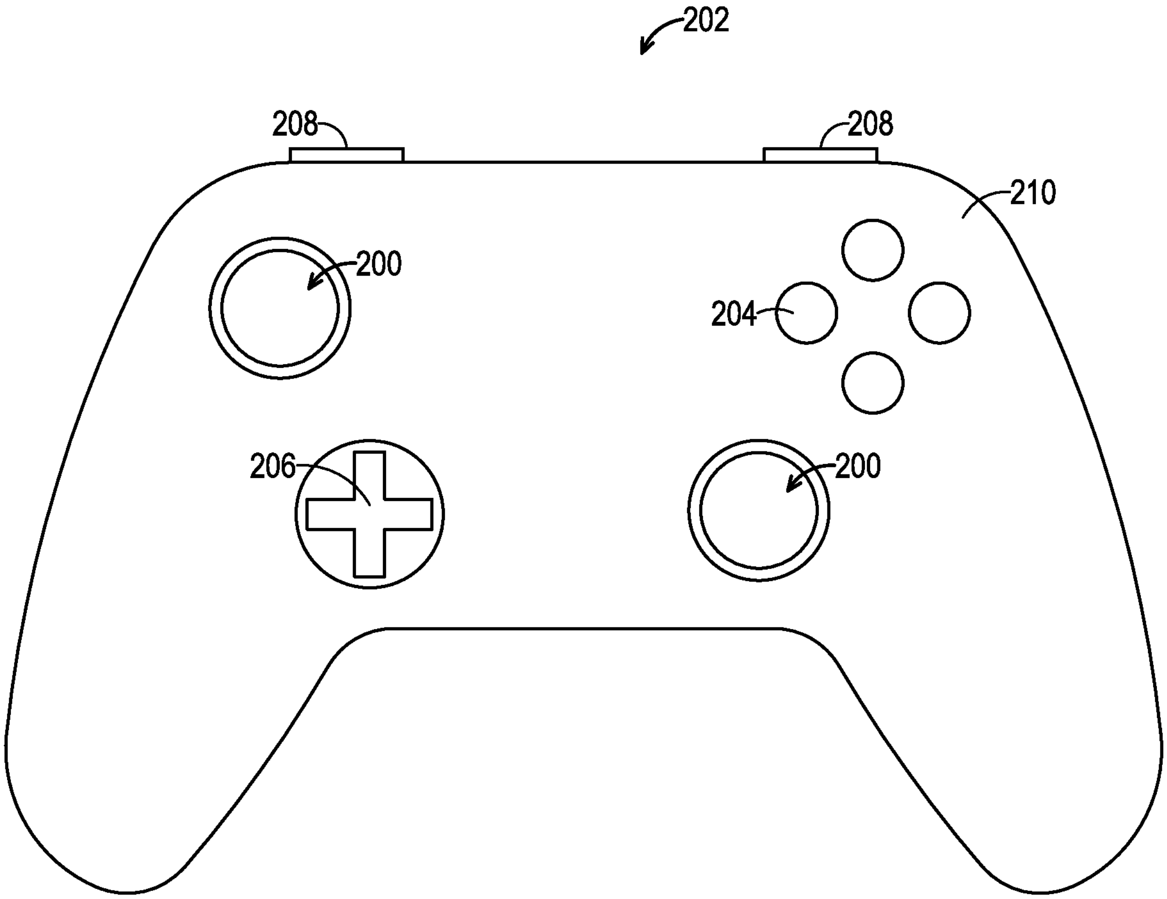
FIG. 16 is a schematic diagram depicting a second illustrative videogame controller in accordance with aspects of the present disclosure.

FIG. 16 depicts a schematic diagram of videogame controller 202 including thumbstick assemblies 200 in accordance with the present teachings. FIG. 16 depicts one example of a videogame controller 202 that incorporates thumbstick assemblies 200, however, thumbstick assemblies 200 may be utilized with any suitable videogame controllers and/or other user input devices. For example, thumbstick assemblies 200 may be utilized with videogame controller 100, described above.

Videogame controller 202 includes one or more buttons 204, directional pads 206, triggers 208, and/or the like. Controller 202 is configured such that actuation of the one or more buttons, directional pads, thumbstick assemblies, and/or triggers causes electrical control signals to be sent from controller 202 to a videogame console via direct connection with the console (e.g., wired connection) and/or a wireless connection with the console (e.g., Bluetooth). In some examples, the buttons, directional pads, and/or triggers of the controller are removable and able to be replaced by buttons, directional pads, and/or triggers of different sizes or shapes according to the user's preferences.

Controller 202 may include a housing 210 configured to enclose internal components of controller 202. For example, housing 210 may enclose one or more circuit boards of controller 202. In some examples, the one or more buttons 204, directional pads 206, thumbstick assemblies 200, and/or triggers 208 are configured as switches of the circuit boards enclosed in housing 210, such that actuation of any one of the buttons, directional pads, thumbsticks, and/or triggers causes control signals to be sent to the console via the wired or wireless connection. Housing 210 may have one or more openings and the one or more buttons, directional pads, thumbsticks, and/or triggers may extend through the openings to be accessible and manipulatable by a user. In some examples, housing 210 includes a rear housing and a front housing coupled together to enclose the internal components of controller 202.

Figure 17:
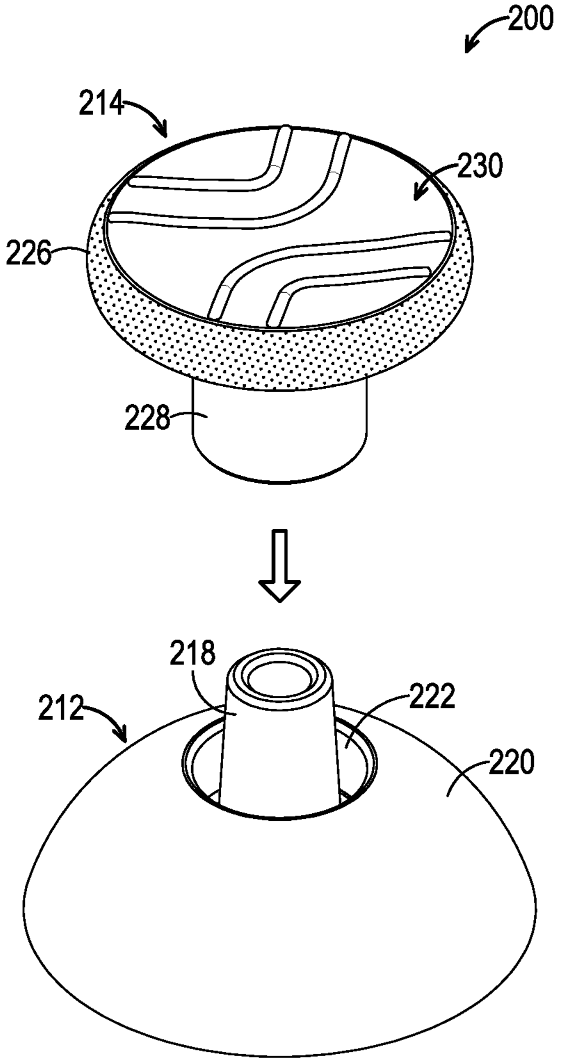
FIG. 17 is an exploded view depicting an illustrative thumbstick assembly suitable for use with the videogame controllers of FIGS. 1-5 and 16.
Figure 18:
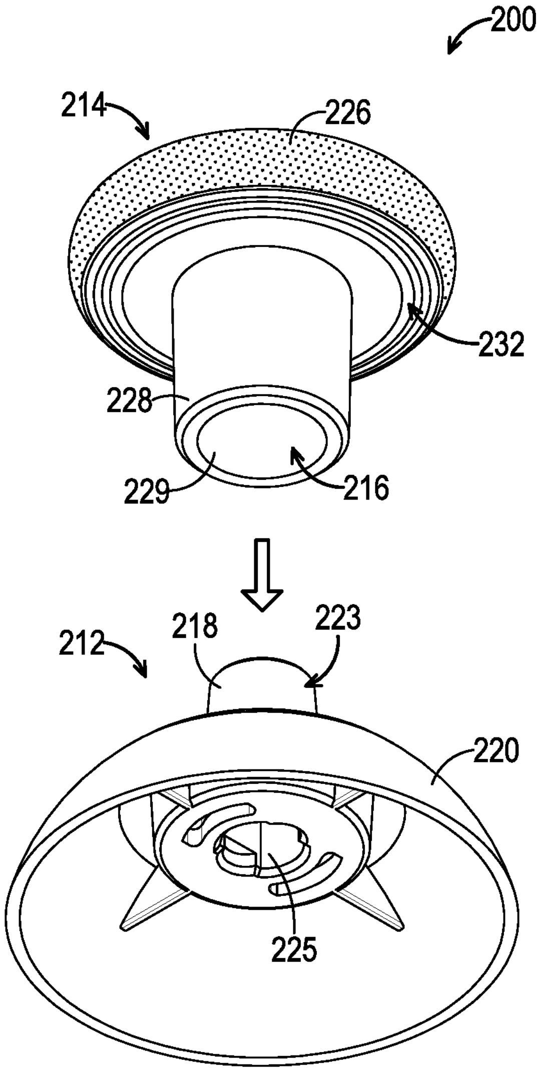
FIG. 18 is a second exploded view of the thumbstick assembly of FIG. 17.

FIGS. 17-20 depict thumbstick assembly 200. Thumbstick assembly 200 is configured to be utilized with any suitable user input device, e.g., controller 202 or controller 100. As shown in FIGS. 17 and 18, thumbstick assembly 200 includes a thumbstick base 212 and a thumbstick top 214 (AKA thumbstick pad) configured to be removably coupled to the thumbstick base. Thumbstick top 214 is removably coupled to thumbstick base 212 by a self-holding tapered connection (e.g., a Morse taper). For example, a tapered bore 216 (AKA tapered female member) of thumbstick top 214 may receive a tapered post 218 (AKA tapered shaft, tapered male member) of thumbstick base 212 that has a matching taper to the tapered bore of the thumbstick top. The self-holding tapered connection facilitates precise alignment of thumbstick top 214 relative thumbstick base 212 and transmission of torque from thumbstick top 214 to thumbstick base 212. In some examples, tapered post 218 and tapered bore 216 have a Morse taper (e.g., approximately 1.49 degree taper) and/or any other suitable self-holding taper.

Thumbstick base 212 may comprise any suitable structure configured to be removably coupled to thumbstick top 214 via the self-holding tapered connection. In the example of FIGS. 17 and 18, thumbstick base 212 includes a dome-shaped shell 220 having an annular aperture 222 formed in a top surface 224 of dome-shaped shell 220. Tapered post 218 of the thumbstick base extends upward through annular aperture 222 and protrudes from the annular aperture. Tapered post 218 is conical having a diameter that decreases consistently from a base of the tapered post to a flat upper end 240 of the tapered post.

Tapered post 218 may have any suitable taper configured to facilitate a self-holding tapered connection with thumbstick top 214. For example, tapered post 218 may have any suitable standard Morse taper, e.g., approximately 1.49 degree taper angle. The tapered post 218 may have a taper angle between 1.4-1.45 degrees, between 1.45-1.5 degrees, and/or any suitable taper angle between 1.4 and 1.5 degrees including 1.4 and 1.5 degrees. In some examples, the tapered post has approximately a 1 mm reduction in diameter for every 19 mm-20.5 mm of length of post 218. As a specific example, tapered post 218 may have a taper angle of approximately 1.49 degrees. This corresponds to approximately a 1 mm reduction in diameter for every 19.22 mm length of the tapered post. Tapered post 218 may have any suitable length and maximum diameter. In some examples, tapered post 218 has one of the eight standard dimensions of Morse tapers (i.e., one of the standard Morse taper numbers 0, 1, 2, 3, 4, 5, 6, 7).

In some examples, thumbstick base 212 is configured to be disposed at least partially within housing 210 of the controller and is configured to be mounted on electronic components of the controller. As shown in FIG. 18, in some examples, thumbstick base 212 includes a lower-post aperture 225 formed in a lower surface of tapered post 218. In some examples, lower-post aperture 225 is configured to be coupled to a thumbstick module 234 and/or any other suitable electronic components of the controller, as described further below.

Thumbstick top 214 may include any suitable structure configured to be manipulated by a finger of a user to control thumbstick assembly 200 and configured to be removably coupled to thumbstick base 212. As shown in FIGS. 17 and 18, thumbstick top 214 includes a head 226 and a stem 228 extending downward from the head. Head 226 is configured to be manipulated by a finger of a user to control thumbstick assembly 200. In some examples, head 226 has an upper surface 230 that is textured and/or upper surface 230 may have a concave shape configured to provide improved grip for a user. Stem 228 extends downward from a lower surface 232 of head 226. Stem 228 may have any suitable length dependent on the user's desired height for the thumbstick head.

Tapered bore 216 is formed in stem 228 of thumbstick top 214. Tapered bore 216 extends through stem 228 generally from a bottom end to a top end of the stem. Tapered bore 216 is conical having a diameter that decreases consistently from an opening of the bore to a flat terminal wall 242 of the tapered bore. Tapered bore 216 is configured to receive tapered post 218 of thumbstick base 212. Tapered bore 216 has a matching or complementary taper to tapered post 218 to facilitate the self-holding connection between thumbstick top 214 and thumbstick base 212. For example, tapered bore 216 may have a matching Morse taper to tapered post 218 (e.g., approximately 1.49 degree taper angle). The tapered bore 216 may have a taper angle between 1.4-1.45 degrees, between 1.45-1.5 degrees, and/or any suitable taper angle between 1.4 and 1.5 degrees including 1.4 and 1.5 degrees. In some examples, the tapered bore has approximately a 1 mm reduction in diameter for every 19 mm-20.5 mm length of the bore. Tapered bore 216 may have matching length and maximum diameter as the tapered post. In some examples, tapered post 218 and tapered bore each have one of the eight standard dimensions of Morse tapers (i.e., one of the standard Morse taper numbers 0, 1, 2, 3, 4, 5, 6, 7).

Thumbstick top 214 is configured to be removably coupled to thumbstick base 212 by inserting tapered post 218 into tapered bore 216. In some examples, a lower end of stem 228 is received in annular aperture 222 of dome-shaped shell 220, when tapered bore 216 is mated with tapered post 218. Thumbstick top 214 is securely coupled to thumbstick base 212 due to an outer surface 223 of tapered post 218 contacting an inner surface 229 of tapered bore 216 having the matching taper. The matching taper of tapered bore 216 and post 218 generates friction that facilitates the self-holding connection between the thumbstick top and the thumbstick base. The tapered connection is configured to facilitate transmitting torque applied by a user from thumbstick top 214 to thumbstick base 212 and is configured to center the thumbstick top on the thumbstick base.

Figure 19:
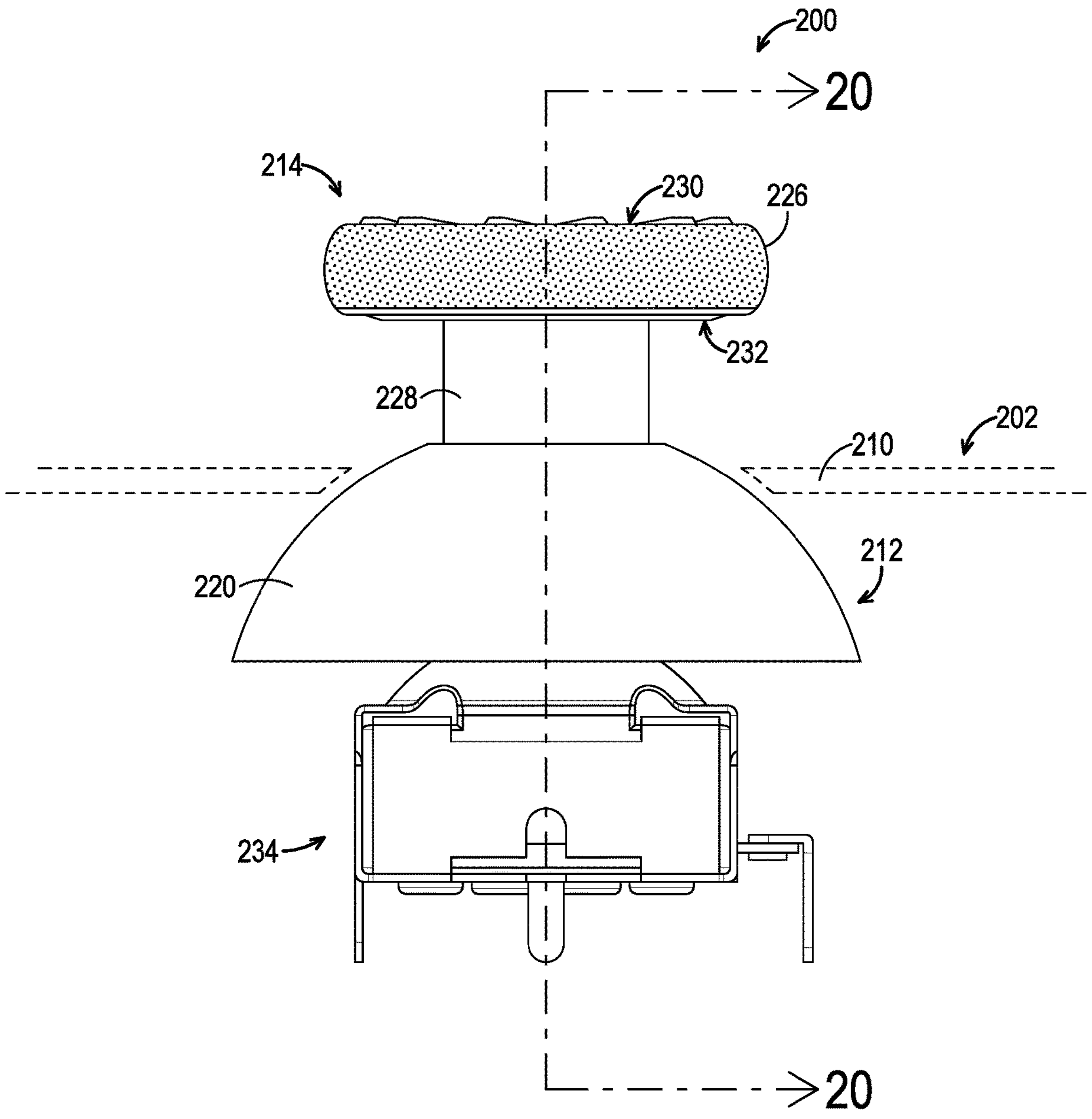
FIG. 19 is a side view of the thumbstick assembly of FIGS. 17 and 18.
Figure 20:
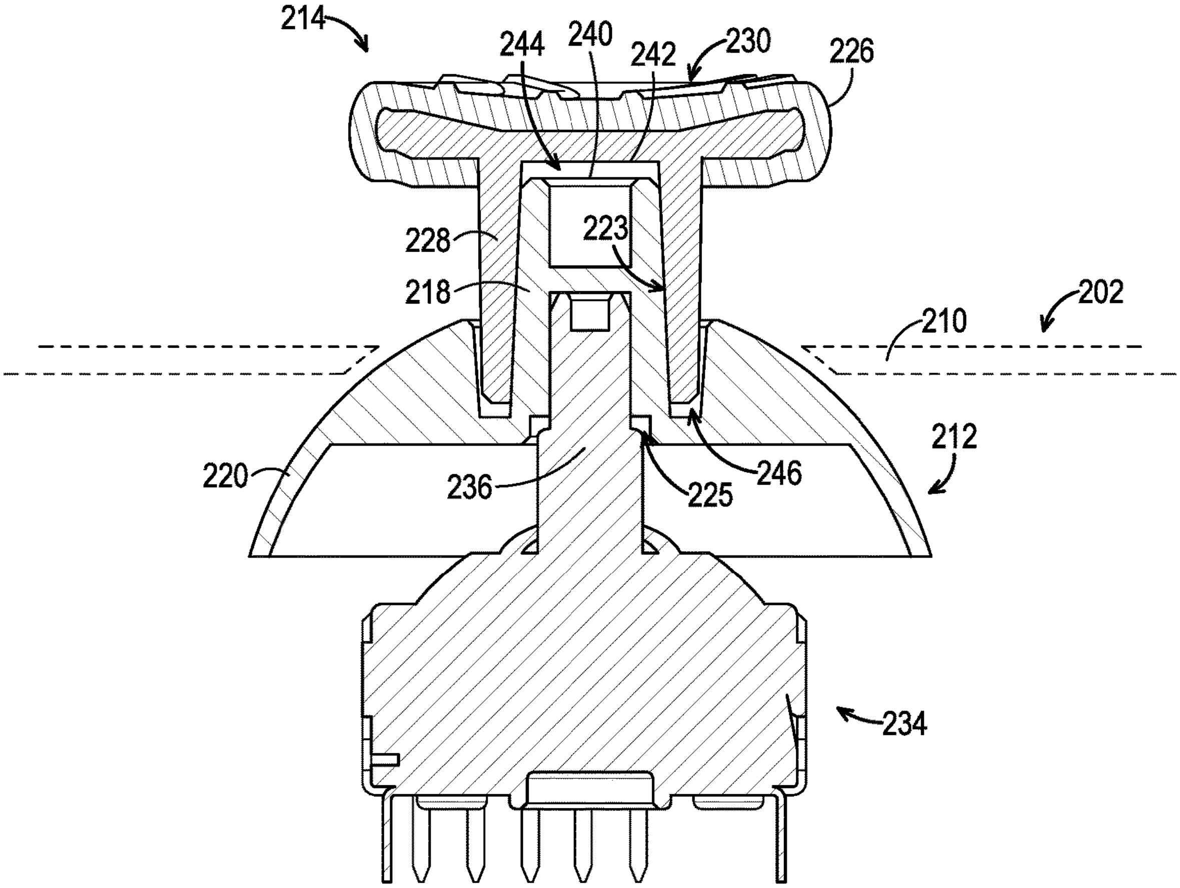
FIG. 20 is a sectional view of the thumbstick assembly of FIGS. 17-19 corresponding to line 5-5 in FIG. 19.

FIG. 19 depicts a side view of the thumbstick assembly 200. FIG. 20 depicts a cross section of the thumbstick assembly corresponding to line 5-5 in FIG. 19. As shown in FIGS. 19 and 20, thumbstick base 212 is configured to be mounted on a thumbstick module 234 that is electronically coupled to a circuit board of controller 202. Thumbstick module 234 may include any suitable electronic components configured to generate control signals based on movement of thumbstick assembly 200. For example, thumbstick module 234 includes a movable post 236 and one more sensors (e.g., potentiometers) configured to detect movement of the movable post 236 and output a control signal based on the movement of the movable post 236. In some examples, the one or more potentiometers may be configured to detect a position of movable post 236 relative to a neutral central position (the position shown in FIGS. 19 and 20) and output the control signal based on the movement of the movable post relative the neutral position. The control signal may then be transmitted from the controller to the console via the wireless or wired connection.

Thumbstick base 212 is coupled to thumbstick module 234 by movable post 236 extending into lower-post aperture 225 formed in a lower end of tapered post 218. Lower-post aperture 225 is disposed at a lateral center of thumbstick base 212 and tapered post 218. This facilitates alignment of movable post 236 with thumbstick base 212 and thumbstick top 214. Thumbstick base 212 is configured to transmit movement from thumbstick top 214 to movable post 236 and the one or more potentiometers of the thumbstick module are configured to output the control signals based on the movement.

As shown in FIG. 20, thumbstick top 214 is removably coupled to thumbstick base 212 by the self-holding tapered connection between tapered bore 216 and tapered post 218. In other words, thumbstick top 214 is configured to be selectively and repeatedly coupled to and removed from thumbstick base 216 without damage to thumbstick top 214 or thumbstick base 216. When thumbstick top 214 is coupled to thumbstick base, inner surface 229 of tapered bore 216 is in contact with the complementary outer surface 223 of tapered post 218 and the contact generates friction that facilitates the self-holding tapered connection. In some examples, tapered post 218 includes flat upper end 240 (AKA flat tail) and tapered bore 216 includes flat terminal wall 242. As shown in FIG. 20, when tapered post 218 is mated with tapered bore 216 flat upper end 240 of tapered post 218 is spaced from flat terminal wall 242 of tapered bore 216 by a gap 244. Similarly, a lower end of stem 228 is spaced from dome-shaped shell 220 by a second gap 246. Gaps 244, 246 ensure that contact between thumbstick base 212 and thumbstick top 214 is limited to the contact between inner surface 229 of tapered bore 216 and outer surface 223 of tapered post 218.

Thumbstick assembly 200 is configured to be customizable according to a user's preferences. For example, thumbstick assembly 200 is compatible with a variety of different thumbstick tops 214 that have different head portion characteristics (e.g., texture, shape, thicknesses etc.). Each thumbstick top 214 may have a unique head portion, but an identical tapered bore 216 configured to mate with tapered post 218 of thumbstick base 212. Thumbstick assembly 200 is configured, such that thumbstick top 214 may be removed from thumbstick base 212 without requiring disassembly of other components of controller 202 or thumbstick assembly 200. The self-holding tapered connection facilitates automatic alignment of thumbstick top 214 with the thumbstick base 212, when the thumbstick top is installed on the thumbstick base.

In some examples, thumbstick top 214 and/or portions of thumbstick top 214 (e.g., stem 228) comprise a resilient and/or elastic material configured to facilitate the removal and installation of thumbstick top 214 on thumbstick base 212, without requiring the use of tools. For example, thumbstick top 214 may comprise a material that is configured to partially deform when acted on by an external force, e.g., a user pulling thumbstick top 214 upward away from thumbstick base 212 and/or pushing the thumbstick top downward onto the thumbstick base. In some examples, thumbstick top 214 is configured to deform only in response to forces greater than standard forces applied to thumbsticks by a user while playing videogames. Thumbstick top 214 may be configured to partially deform under forces applied by a user, without the use of a tool. In some examples, the force applied by the user causes a partial deformation of inner surface 229 of tapered bore 216 contacting outer surface 223 of tapered post 218. This may reduce the frictional force between tapered bore 216 and tapered post 218 to facilitate removal of thumbstick top 214 from thumbstick base 212.

Thumbstick top 214 may be installed on thumbstick base 212 by a user aligning tapered bore 216 with tapered post 218, and applying a downward force on thumbstick top 214, such that tapered post 218 is mated with tapered bore 216. When tapered post 218 is mated with tapered bore 216, thumbstick top 214 is securely held to thumbstick base 212 due to the friction between tapered bore 216 and tapered post 218. Thumbstick top 214 may be removed from thumbstick base 212 by a user twisting thumbstick top 214 and/or applying an upward force on thumbstick top 214 that overcomes the friction between tapered bore 216 and tapered post 218. As described above, in some examples, thumbstick top 214 comprises the elastic material configured to deform in response to the twisting and/or upward force applied by the user to facilitate the removal of the thumbstick top.

C. Illustrative Combinations and Additional Examples

This section describes additional aspects and features of handheld videogame controllers and thumbstick assemblies, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner.

Some of the paragraphs below expressly refer to and further limit other paragraphs, providing without limitation examples of some of the suitable combinations.

A. A handheld videogame controller comprising:

a housing including a docking bay configured to selectively receive a handheld videogame console;

an electronic connector disposed in the docking bay and configured to electronically connect the controller to the handheld videogame console; and a locking mechanism disposed in the docking bay and configured to selectively retain the handheld videogame console in the docking bay, such that the handheld videogame console remains connected to the electronic connector when engaged by the locking mechanism.

A1. The handheld videogame controller of paragraph A, wherein the docking bay comprises a U-shaped slot configured to receive the handheld videogame console.

A1.1. The handheld videogame controller of paragraph A1, wherein the U-shaped slot comprises a bottom channel extending horizontally across the controller, a left-side channel extending vertically from a left end of the bottom channel, and a right-side channel extending vertically from a right end of the bottom channel.

A1.2. The handheld videogame controller of paragraph A1.1. , wherein the electronic connector is disposed in the bottom channel.

A1.3. The handheld videogame controller of paragraph A1.1 or A1.2, wherein a portion of the locking mechanism is disposed in the left-side channel and the right-side channel.

A1.4. The handheld videogame controller of any one of paragraphs A1.1-A1.3, wherein the right-side channel is configured to receive a right side of the handheld videogame console, the left-side channel is configured to receive a left side of the handheld videogame console, and the bottom channel is configured to receive a bottom side of the handheld videogame console.

A2. The handheld videogame controller of any one of paragraphs A-A1.4, wherein the electronic connector comprises a USB-C connector.

A2.1. The handheld videogame controller of paragraph A2, wherein the USB-C connector is configured to mate with a USB-C port of the handheld videogame console.

A3. The handheld videogame controller of any one of paragraphs A-A2.1, wherein the locking mechanism is configured to allow the console to be received in the docking bay and to prevent the console from being removed from the docking bay.

A4. The handheld videogame controller of any one of paragraphs A-A3, wherein the locking mechanism includes at least one latch disposed within the docking bay, wherein the at least one latch is configured to engage the console to selectively retain the console in the docking bay.

A4.1. The handheld videogame controller of paragraph A4, wherein the locking mechanism further comprises an elastic member configured to bias the at least one latch toward an inward position in which the at least one latch is disposed within the docking bay, and wherein the elastic member is configured to permit the at least one latch to be transitioned to an outward position in which the at least one latch is disposed outside of the docking bay.

A4.2. The handheld videogame controller of paragraph A4.1, wherein the at least one latch is configured to engage the console and retain the console in the docking bay when disposed in the inward position, and wherein the at least one latch is configured permit the console to move in the docking bay when disposed in the outward position.

A4.3. The handheld videogame controller of any one of paragraphs A4-A4.3, further comprising a release mechanism configured to transition the at least one latch to a/the outward position in which the at least one latch is disengaged from the console and the console is removable from the docking bay.

A4.4. The handheld videogame controller of paragraph A4.3, wherein the release mechanism comprises a wedge configured to be actuated by a user to apply an outward force on the at least one latch, such that the at least one latch is transitioned to the outward position.

A5. The handheld videogame controller of any one of paragraphs A-A4.4, further comprising one or more buttons, thumbsticks, triggers, and directional pads coupled to the housing, wherein actuation of the one or more buttons, thumbsticks, triggers, and directional pads causes electrical signals to be transmitted from the controller to the handheld videogame console through the electronic connector.

A5.1. The handheld videogame controller of paragraph A5, wherein the one or more buttons, thumbsticks, triggers, and directional pads are removable and replaceable by buttons, thumbsticks, triggers, and directional pads of different sizes.

A6. The handheld videogame controller any one of paragraphs A-A5.1, further comprising a charging port configured to receive a charge connector to charge a battery of the controller.

A7. The handheld videogame controller of any one of paragraphs A-A6, wherein the docking bay is sized and shaped to receive the handheld videogame console.

A8. The handheld videogame controller of any one of paragraphs A-A7, further comprising:

one or more circuit boards enclosed in the housing, wherein the one or more circuit boards are in electronic communication with the electronic connector.

A9. The handheld videogame controller of any one of paragraphs A-A8, further comprising a thumbstick assembly coupled to the housing, the thumbstick assembly including:

a thumbstick base having a tapered post extending upward from the housing of the controller;

a thumbstick top having a head and a shaft extending downward from the head, wherein the thumbstick top includes a tapered bore formed in the shaft, and wherein the tapered bore has a matching taper to the tapered post;

wherein the thumbstick top is configured to be removably coupled to the thumbstick base by a self-holding tapered connection between the tapered bore and the tapered post.

B. A handheld videogame controller comprising:

a housing including a docking bay configured to selectively receive a handheld videogame console;

a first electronic connector disposed in the docking bay and configured to mate with a second electronic connector of the console to electronically connect the controller to the handheld videogame console; and a locking mechanism including:

at least one latch biased toward an inward position in which the at least one latch is configured to retain the console in the docking bay, such that the first electronic connector remains mated with the second electronic connector; and a release actuator configured to be actuated by a user to release the at least one latch from the handheld videogame console, such that the console is permitted to move with respect to the docking bay.

B1. The handheld videogame controller of paragraph B, wherein the docking bay is configured to securely hold three sides of the console.

B2. The handheld videogame controller of paragraph B or B1, wherein the docking bay comprises a bottom channel extending horizontally across the controller, a left-side channel extending vertically from a left end of the bottom channel, and a right-side channel extending vertically from a right end of the bottom channel.

B2.1. The handheld videogame controller of paragraph B2, wherein the first electronic connector is disposed in the bottom channel.

B2.2. The handheld videogame controller of claim B2 or B2.1, wherein the at least one latch includes a first latch disposed in the left-side channel and a second latch disposed in the right-side channel.

B2.3. The handheld videogame controller of any one of paragraphs B2-B2.2, wherein the right-side channel is configured to receive a right side of the console, the left-side channel is configured to receive a left side of the console, and the bottom channel is configured to receive a bottom side of the console.

B2.4. The handheld videogame controller of any one of paragraphs B2-B2.3, wherein the left-side channel and the right-side channel each have an open upper end configured to receive the console.

B3. The handheld videogame controller of claim 7, wherein the first electronic connector comprises a USB-C connector and the second electronic connector comprises a USB-C port configured to mate with the USB-C connector.

B4. The handheld videogame controller of any one of paragraphs B-B3, wherein the locking mechanism is configured to allow the console to be received in the docking bay and to prevent the console from being removed from the docking bay.

B5. The handheld videogame controller of any one of paragraphs B-B4, wherein the locking mechanism is configured to release the console only in response to actuation of the release actuator.

B6. The handheld videogame controller of any one of paragraphs B-B5, wherein the locking mechanism further comprises an elastic member configured to bias the at least one latch toward the inward position in which the at least one latch is disposed within the docking bay, and wherein the elastic member is further configured to permit the at least one latch to be transitioned to an outward position in which the at least one latch is disposed outside of the docking bay.

B6.1. The handheld videogame controller of paragraph B6, wherein the at least one latch is configured to engage the console and retain the console in the docking bay when in the inward position, and wherein the at least one latch is configured to permit the console to move with respect to the docking bay when the latch is disposed in the outward position.

B7. The handheld videogame controller of any one of paragraphs B-B6.1, wherein the release actuator is configured to transition the at least one latch to an outward position in which the at least one latch is disengaged from the console and the console is removable from the docking bay.

B7.1. The handheld videogame controller of paragraph B7, wherein the release actuator comprises a wedge configured to be actuated by the user to transition the at least one latch to the outward position.

B8. The handheld videogame controller of any one of paragraphs B-B7.1, further comprising one or more buttons, thumbsticks, triggers, and/or directional pads coupled to the housing, wherein actuation of the one or more buttons, thumbsticks, triggers, and/or directional pads causes electrical signals to be transmitted from the controller to the handheld videogame console through the electronic connector.

B9. The handheld videogame controller of any one of paragraphs B-B8, further comprising a charging port configured to receive a charge connector to charge a battery of the controller.

B10. The handheld videogame controller of any one of paragraphs B-B9, further comprising a thumbstick assembly coupled to the housing, the thumbstick assembly including:

a thumbstick base having a tapered post extending upward from the housing of the controller; and a thumbstick top having a head and a shaft extending downward from the head, wherein the thumbstick top includes a tapered bore formed in the shaft, and wherein the tapered bore and the tapered post have a matching taper;

wherein the thumbstick top is configured to be selectively and repeatedly coupled to and removed from the thumbstick base by only a self-holding tapered connection between the tapered bore and the tapered post.

C. A thumbstick assembly for a videogame controller, the thumbstick assembly comprising:

a thumbstick base including a tapered post extending upward;

a thumbstick top including a head and a shaft extending downward from the head, wherein the thumbstick top includes a tapered bore formed in the shaft, and wherein the tapered bore has a matching taper to the tapered post;

wherein the thumbstick top is configured to be removably coupled to the thumbstick base by a self-holding tapered connection between the tapered bore and the tapered post.

C1. The thumbstick assembly of paragraph C, wherein the tapered post and the tapered bore each have a matching morse taper, e.g., between a 1.4-1.5 degree taper angle.

C2. The thumbstick assembly of paragraph C or C1, wherein the thumbstick base is configured to be mounted on a thumbstick module of the controller.

C2.1. The thumbstick assembly of paragraph C2, wherein the thumbstick base comprises a lower aperture configured to mate with a mounting post of the thumbstick module of the controller.

C3. The thumbstick assembly of any one of paragraphs C-C2.1, wherein the head has a concave upper surface.

C4. The thumbstick assembly of any one of paragraphs C-C3, wherein the thumbstick top comprises an elastic material configured to partially deform when acted on by an external force.

C5. The thumbstick assembly of any one of paragraphs C-C4, wherein the thumbstick top is configured to be secured to the thumbstick base by friction between an inner surface of the tapered bore and an outer surface of the tapered post.

C6. The thumbstick assembly of any one of paragraphs C-C5, wherein the thumbstick top is configured to be selectively and repeatedly coupled to and removed from the thumbstick base without damaging the thumbstick top or the thumbstick base.

D. A thumbstick assembly for a videogame controller, the thumbstick assembly comprising:

a thumbstick base including a tapered post; and a thumbstick top including a head and a shaft extending away from the head, wherein the thumbstick top includes a tapered bore formed in the shaft, and wherein the tapered bore and the tapered post have a matching taper;

wherein the thumbstick top is configured to be selectively and repeatedly coupled to and removed from the thumbstick base by only a self-holding tapered connection between the tapered bore and the tapered post.

D1. The thumbstick assembly of paragraph D, wherein the matching taper is a Morse taper.

D2. The thumbstick assembly of paragraph D or D1, wherein the thumbstick base is configured to be coupled to a thumbstick module of the controller.

D3. The thumbstick assembly of any one of paragraphs D-D2, wherein the thumbstick top is configured to be selectively and repeatedly coupled to and removed from the thumbstick base without damaging the thumbstick top or the thumbstick base.

E. A method of using a handheld videogame controller comprising:

inserting a videogame console in a docking bay of the videogame controller, wherein the videogame controller is configured to receive the videogame console such that a first electronic connector of the videogame controller is mated with a second electronic connecter of the videogame console to electronically connect the videogame controller to the videogame console, and such that at least one latch of the videogame controller retains the videogame console in the docking bay;

moving the handheld videogame console and the handheld videogame controller as a single unit.

E1. The method of paragraph E, further comprising:

actuating a release actuator of the videogame controller, wherein the release actuator is configured to disengage the at least one latch from the videogame console, such that the videogame console is permitted to move with respect to the docking bay; and removing the videogame console from the docking bay.

E1.1. The method of paragraph E1, wherein the release mechanism comprises a wedge, and wherein actuating the release actuator comprises sliding the wedge upward relative to a housing of the controller.

Advantages, Features, and Benefits

The different embodiments and examples of the handheld videogame controllers and thumbstick assemblies described herein provide several advantages over known solutions for controllers and controller thumbsticks. For example, illustrative embodiments and examples described herein allow for a handheld videogame controller configured to directly connect to a handheld videogame console via an electronic connector (e.g., USB-C) as opposed to wirelessly. The direct connection between the controller and the handheld video console reduces latency and avoids other connectivity issues.

Additionally, and among other benefits, illustrative embodiments and examples described herein allow a controller including a docking bay having left-side, right-side, and bottom channels configured to receive and securely hold a left side, right side, and bottom side of the videogame console, respectively. The left-side, right-side, and bottom channels of the docking bay are configured to prevent lateral movement of the console relative to the controller. Additionally, the left side, right side, and bottom channels are configured to facilitate maintaining the direct electronic connection between the console and the controller.

Additionally, and among other benefits, illustrative embodiments and examples described herein allow a locking mechanism configured to allow the videogame console to be received in the docking bay of the controller and prevent the videogame console from being removed from the docking bay of the controller. The locking mechanism is configured to facilitate a user moving and manipulating the controller and the console as a single unit and prevent the videogame console from falling out of the controller unexpectedly. The locking mechanism facilitates maintaining the connection between the USB-C connector of the controller and the USB-C port of the console by preventing the movement of the console in the docking bay of the controller.

Additionally, and among other benefits, illustrative embodiments and examples described herein include a user-actuatable release mechanism configured to release the locking mechanism from the console, such that the console may be removed from the controller. The locking mechanism is configured to release the console from the docking bay only in response to a user actuating the release mechanism. This prevents unwanted disengagement of the console from the controller.

Additionally, and among other benefits, illustrative embodiments and examples described herein allow a controller to have features configured to accommodate one or more specific handheld videogame consoles (e.g., Standard Nintendo Switch and OLED Nintendo Switch). For example, the controller may include a docking bay sized and shaped to receive the specific console(s). In some examples, the docking bay includes one or more bosses configured to facilitate alignment of the console with the electronic connector of the controller to facilitate the direct electronic connection between the console and the controller.

Additionally, and among other benefits, illustrative embodiments and examples described herein allow a controller having high quality components. For example, the controller may include thumbsticks having hall sensors configured to reduce stick drift.

Additionally, and among other benefits, illustrative embodiments and examples described herein allow a controller having interchangeable components, such that a user can easily customize the controller according to the user's preferences.

Additionally, and among other benefits, illustrative embodiments and examples described herein allow thumbstick assemblies including a self-holding tapered connection (e.g., a Morse tapered connection) between a thumbstick top and a thumbstick base of the thumbstick assembly. The self-holding tapered connection facilitates precise alignment of the thumbstick top relative thumbstick base (e.g., centering of the thumbstick top and the thumbstick base) and transmission of torque from the thumbstick top to the thumbstick base.

Additionally, and among other benefits, illustrative embodiments and examples described herein allow thumbstick assemblies that have a plurality of different thumbstick tops having different sizes and/or shapes according to a user's preferences. For example, each thumbstick top may have different shapes and/or sizes and each thumbstick top may have the same tapered bore that facilitates the removable connection with the thumbstick base.

Additionally, and among other benefits, illustrative embodiments and examples described herein allow a thumbstick assembly that is compatible with any suitable user input device, e.g., a videogame controller. In some examples, the thumbstick base of the thumbstick assembly is configured to be mounted on any suitable electronic thumbstick modules having a movable connecting post and one or more sensors (e.g., potentiometers).

Additionally, and among other benefits, illustrative embodiments and examples described herein allow the removal and installation of the thumbstick tops on the thumbstick base without disassembling other components of the controller.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A handheld videogame controller comprising:
- a housing including a docking bay configured to selectively receive a handheld videogame console;
- a first electronic connector disposed in the docking bay and configured to mate with a second electronic connector of the handheld videogame console to electronically connect the handheld videogame controller to the handheld videogame console; and
- a locking mechanism including:
  - at least one latch biased toward an inward position in which the at least one latch is configured to retain the handheld videogame console in the docking bay, such that the first electronic connector remains mated with the second electronic connector; and
  - a release actuator configured to be actuated by a user to release the at least one latch from the handheld videogame console, such that the handheld videogame console is permitted to move with respect to the docking bay.

2. The handheld videogame controller of claim 1, wherein the docking bay is configured to securely hold three sides of the handheld videogame console.

3. The handheld videogame controller of claim 1, wherein the docking bay comprises a bottom channel extending horizontally across the handheld videogame controller, a left-side channel extending vertically from a left end of the bottom channel, and a right-side channel extending vertically from a right end of the bottom channel.

4. The handheld videogame controller of claim 3, wherein the first electronic connector is disposed in the bottom channel.

5. The handheld videogame controller of claim 3, wherein the at least one latch includes a first latch disposed in the left-side channel and a second latch disposed in the right-side channel.

6. The handheld videogame controller of claim 3, wherein the right-side channel is configured to receive a right side of the handheld videogame console, the left-side channel is configured to receive a left side of the handheld videogame console, and the bottom channel is configured to receive a bottom side of the handheld videogame console.

7. The handheld videogame controller of claim 3, wherein the left-side channel and the right-side channel each have an open upper end configured to receive the handheld videogame console.

8. The handheld videogame controller of claim 1, wherein the first electronic connector comprises a USB-C connector and the second electronic connector comprises a USB-C port configured to mate with the USB-C connector.

9. The handheld videogame controller of claim 1, wherein the locking mechanism is configured to allow the handheld videogame console to be received in the docking bay and to prevent the handheld videogame console from being removed from the docking bay.

10. The handheld videogame controller of claim 1, wherein the locking mechanism is configured to permit the handheld videogame console to move with respect to the docking bay only in response to actuation of the release actuator.

11. The handheld videogame controller of claim 1, wherein the locking mechanism further comprises an elastic member configured to bias the at least one latch toward the inward position in which the at least one latch is disposed within the docking bay, and wherein the elastic member is further configured to permit the at least one latch to be transitioned to an outward position in which the at least one latch is disposed outside of the docking bay.

12. The handheld videogame controller of claim 11, wherein the at least one latch is configured to engage the handheld videogame console and retain the handheld videogame console in the docking bay when in the inward position, and wherein the at least one latch is configured to permit the handheld videogame console to move with respect to the docking bay when the latch is disposed in the outward position.

13. The handheld videogame controller of claim 11, wherein the elastic member is configured to permit the at least one latch to transition:

(a) from the inward position to the outward position when the at least one latch is contacted by the handheld videogame console to permit the handheld videogame console to be inserted into the docking bay; and (b) from the outward position to the inward position when the at least one latch is aligned with a groove formed in a side of the handheld videogame console to retain the handheld videogame console in the docking bay.

14. The handheld videogame controller of claim 1, wherein the release actuator is configured to transition the at least one latch to an outward position in which the at least one latch is disengaged from the handheld videogame console and the handheld videogame console is removable from the docking bay.

15. The handheld videogame controller of claim 14, wherein the release actuator comprises a wedge configured to be actuated by the user to transition the at least one latch to the outward position.

16. The handheld videogame controller of claim 1, further comprising one or more buttons, thumbsticks, triggers, and/or directional pads coupled to the housing, wherein actuation of the one or more buttons, thumbsticks, triggers, and/or directional pads causes electrical signals to be transmitted from the handheld videogame controller to the handheld videogame console through the first electronic connector.

17. The handheld videogame controller of claim 1, further comprising a charging port configured to receive a charge connector to charge a battery of the handheld videogame controller.

18. The handheld videogame controller of claim 1, further comprising a thumbstick assembly coupled to the housing, the thumbstick assembly including:

a thumbstick base having a tapered post extending upward from the housing of the handheld videogame controller; and a thumbstick top having a head and a shaft extending downward from the head, wherein the thumbstick top includes a tapered bore formed in the shaft, and wherein the tapered bore and the tapered post have a matching taper;

wherein the thumbstick top is configured to be selectively and repeatedly coupled to and removed from the thumbstick base by only a self-holding tapered connection between the tapered bore and the tapered post.

* * * * *